US011937583B2

(12) United States Patent
Li et al.

(10) Patent No.: US 11,937,583 B2
(45) Date of Patent: Mar. 26, 2024

(54) FOOD DELIVERY AND FEEDING SYSTEM

(71) Applicant: Shenzhen Oceanwing Smart Innovations Technology Co., Ltd, Changsha (CN)

(72) Inventors: Jiang Li, Shenzhen (CN); Zhihai Zhang, Shenzhen (CN)

(73) Assignee: Shenzhen Oceanwing Smart Innovations Technology Co., Ltd, Shenzhen (CN)

( * ) Notice: Subject to any disclaimer, the term of this patent is extended or adjusted under 35 U.S.C. 154(b) by 312 days.

(21) Appl. No.: 17/480,883

(22) Filed: Sep. 21, 2021

(65) Prior Publication Data

US 2022/0338441 A1 Oct. 27, 2022

(51) Int. Cl.
*A01K 5/01* (2006.01)
*A01K 5/02* (2006.01)

(52) U.S. Cl.
CPC .......... *A01K 5/0114* (2013.01); *A01K 5/0225* (2013.01); *A01K 5/0291* (2013.01)

(58) Field of Classification Search
CPC .... A01K 5/0114; A01K 5/0225; A01K 5/029; A01K 5/0233; A01K 5/0241; A01K 5/0258; A01K 5/0275; A01K 5/0291
See application file for complete search history.

(56) References Cited

U.S. PATENT DOCUMENTS 2,583,203 A * 1/1952 Bergeron ............. A01K 39/012 248/149
4,834,060 A 5/1989 Greene
11,235,223 B1 * 2/2022 Fernandez ............. A63B 43/00
(Continued)

FOREIGN PATENT DOCUMENTS

CN 110896872 A 3/2020
CN 111512985 A 8/2020
(Continued)

OTHER PUBLICATIONS

Amazon Product Listing, "SKYMEE Petalk AI II Dog Camera Automatic Treat Dispenser, WiFi Full HD Pet Camera with 180° Pan Full-Room View, Night Vision, Two Way Audio for Dogs and Cats," retrieved Sep. 21, 2021 from https://www.amazon.com/SKYMEE-Automatic-Dispenser-Full-Room-Compatible/db/B081SVJ5BN, 12 pages.
(Continued)

*Primary Examiner* — Ebony E Evans
(74) *Attorney, Agent, or Firm* — Banner & Witcoff, Ltd.

(57) ABSTRACT

Systems, apparatuses, and methods are described for a food delivery and feeding. An apparatus may comprise: a base; an ejection device configured to eject, via a food outlet on the apparatus, one or more of a plurality of food items; and a rotation device operably mounted to the ejection device. The rotation device may be configured to rotate the ejection device relative the base to cause a change to a direction of ejection of the one or more of the plurality of food items relative to the base. The rotation device may comprise a motor and a ring gear. The motor may be connected to the ring gear. The ring gear may be connected to a bracket assembly. The rotation of the bracket assembly may cause the rotation of the ejection device.

19 Claims, 11 Drawing Sheets

10
50
60

(56) References Cited

U.S. PATENT DOCUMENTS

2008/0127903 A1* 6/2008 Mann ........................ A01K 5/01
119/657
2014/0083364 A1* 3/2014 Anderson .............. A01K 15/02
119/51.01
2016/0262351 A1* 9/2016 Hamill ................. A01K 15/027
2020/0100460 A1* 4/2020 Chen .................... A01K 5/0225
2021/0315185 A1* 10/2021 Qiu ...................... A01K 15/025

FOREIGN PATENT DOCUMENTS

CN 112005906 A 12/2020
CN 112056260 A * 12/2020
JP 3205074 U 7/2016

OTHER PUBLICATIONS

Feb. 1, 2023—U.S. Non-Final Office Action—U.S. Appl. No. 17/481,201.
Oct. 11, 2022—(JP) Office Action—App 2021-159358, pp. 6.
Jun. 3, 2023—U.S. Final Office Action—U.S. Appl. No. 17/481,201.

* cited by examiner

FOOD DELIVERY AND FEEDING SYSTEM

CROSS-REFERENCE TO RELATED APPLICATION

This application claims the priority of Chinese Application 202110460480.X, filed on Apr. 27, 2021. The entire disclosures of the prior application are incorporated herein.

TECHNOLOGY FIELD

The present application relates to the technical field of pet feeding, and in particular to a food delivery and feeding system.

BACKGROUND

Intelligent pet feeding devices with monitoring and feeding functions can provide remote services. When a user (e.g., pet owner) is not at home, the user can monitor a pet using a pet feeding device, and remotely control the pet feeding device through a mobile phone to eject food items and interact with the pet. This remote interaction between the user and the pet is becoming increasingly popular.

DETAILED DESCRIPTION OF EMBODIMENTS

In order to make the purpose, technical solutions and advantages of the present application clearer, the technical solutions in the embodiments of the present application will be described clearly and completely below in conjunction with the embodiments of the present application. Obviously, the described embodiments are a part of the embodiments of the present application and not all of them. Based on the embodiments in this application, all other embodiments obtained without creative labor by a person of ordinary skill in the art fall within the scope of protection of this application. Without conflict, the embodiments and features in the embodiments described below may be combined with each other.

To solve the technical problem that the ejection force of the ejection device in the related technology is seriously lost, the present application provides an ejection device and a feeding equipment, the ejection device includes an ejection cavity, an ejection member, an elastic member, an ejection gear and a first ejection drive assembly; the ejection member is provided in the ejection cavity and connected to the ejection cavity by the elastic member; the ejection gear includes a main body and an engagement area and a toothless area provided on the outer periphery of the main body, the main body is connected to the first. The body is connected to the first ejection drive assembly; the ejection member is connected to a drive rack, and during the rotation of the ejection gear by the first ejection drive assembly, the engagement area is directed toward the drive rack to engage with the drive rack, or the toothless area is directed toward the drive rack to disengage from the engagement area.

Figure 1:
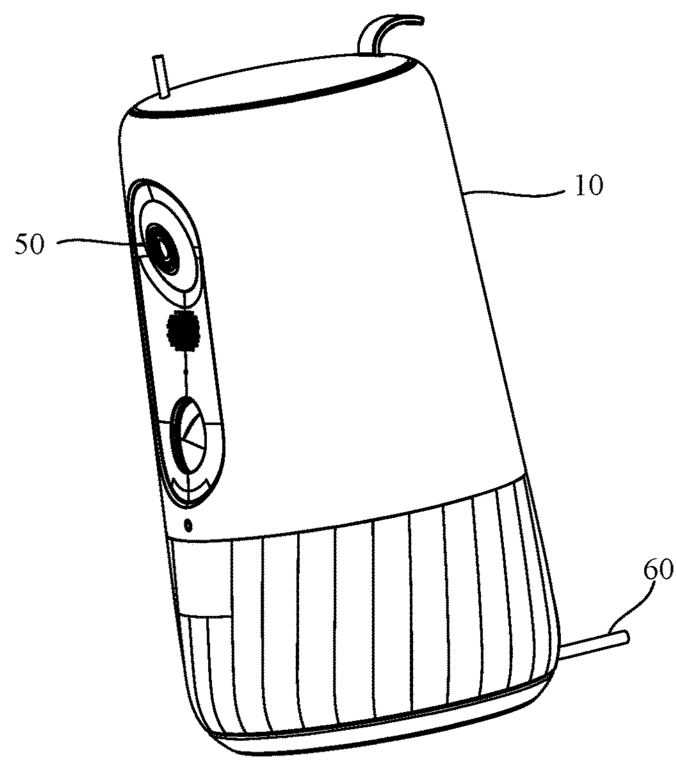
FIG. 1 is a schematic diagram of the feeding equipment of an embodiment of the present application.
Figure 2:
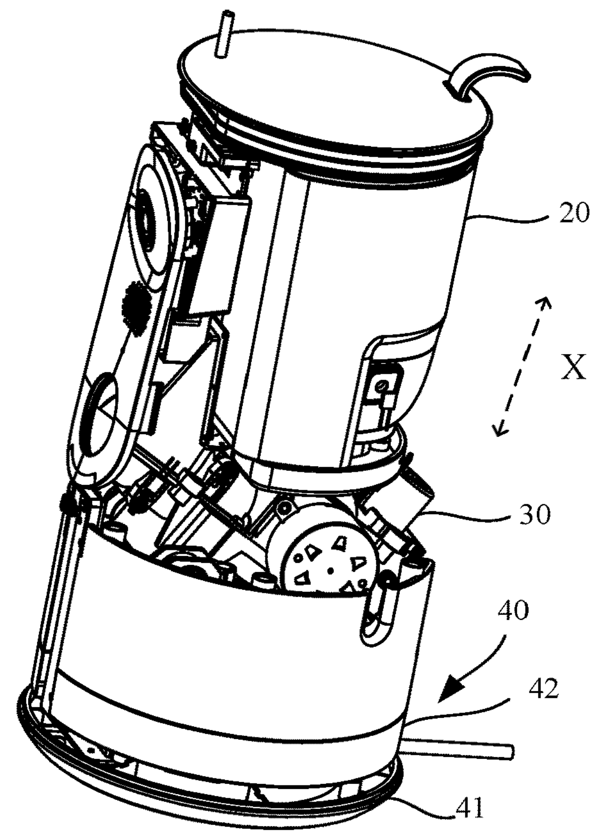
FIG. 2 is a schematic diagram of the feeding equipment in FIG. 1 omitting part of a housing assembly.

Referring to FIG. 1 and FIG. 2, FIG. 1 is a schematic diagram of the feeding equipment of an embodiment of the present application, and FIG. 2 is a schematic diagram of the feeding equipment in FIG. 1 omitting part of a housing assembly.

Figure 3:
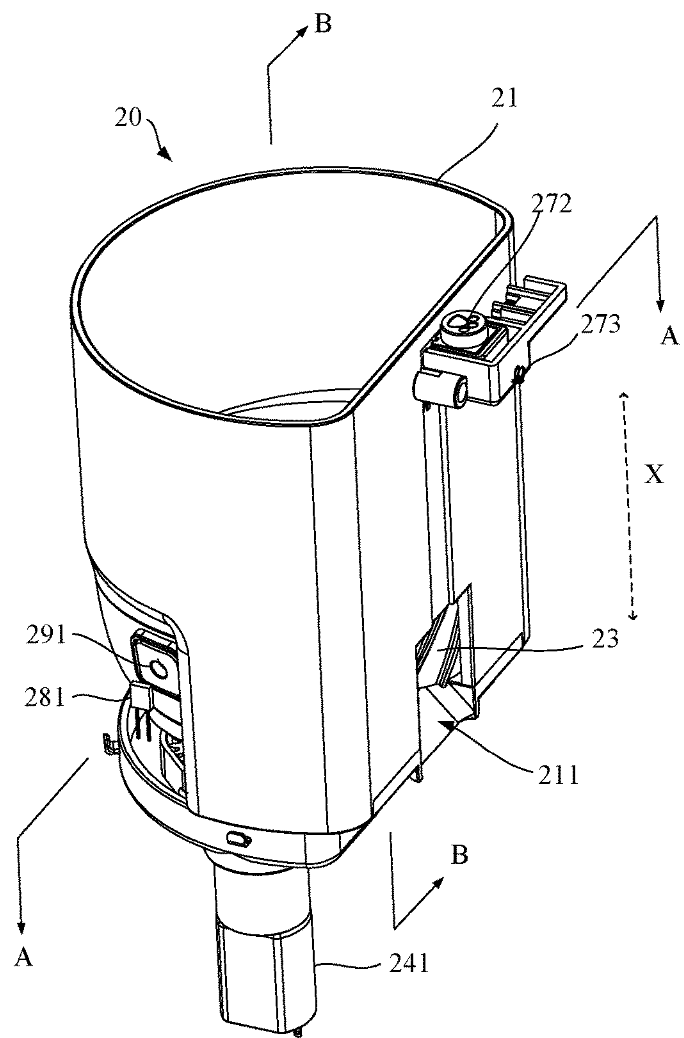
FIG. 3 is a schematic diagram of a storage device of an embodiment of the present application.

In one embodiment, the feeding equipment includes a housing assembly 10 (e.g., a housing), a storage device 20, an ejection device 30, and a rotation device 40. The housing assembly 10 is used to hold and carry other components of the feeding equipment. The storage device 20 is provided in the housing assembly 10 for storing food particles. The ejection device 30 is provided in the housing assembly 10 and is connected to the storage device 20. The ejection device 30 is located on a discharge side 211 of the storage device 20 (as shown in FIG. 3) for ejecting the food particles (e.g., food items) from the storage device 20, which means the food particles in the storage device 20 can enter (e.g., move to) the ejection device 30 and be ejected to the outside by the ejection device 30, via an outlet on the housing assembly 10.

The rotation device 40 includes a base 41, a bracket assembly 42, a head drive assembly 43, and a rolling structure. The bracket assembly 42 is rotatably attached to the base 41. The head drive assembly 43 is provided on the base 41, and the head drive assembly 43 is connected to the bracket assembly 42 to drive the bracket assembly 42 to rotate. The head drive assembly 43 could also be provided on the bracket assembly 42, and the head drive assembly 43 is connected to the base 41 to drive the base 41 to rotate. That is, the head drive assembly 43 is capable of driving the base 41 and the bracket assembly 42 to rotate relative to each other. The rolling structure is located between the base 41 and the bracket assembly 42 to reduce rotational friction when the base 41 and bracket assembly 42 are rotating relative to each other, thereby improving the stability of the rotation device 40. In other words, the rotation of the holder assembly 42 relative to the base 41 causes the storage device 20 and the ejection device 30 to rotate relative to the base 41 or the holder assembly 42, thereby enabling the direction of ejection of food particles to be changed.

It is readily understood that if the rotational friction between the bracket assembly 42 and the base 41 is high and the rotation of the rotation device 40 is less smooth, the stability of the rotation device 40 will be bad. In this embodiment, the rolling structure enables the bracket assembly 42 to rotate at a uniform rate relative to the base 41 to improve the stability of the rotation device 40.

It can be seen that the feeding equipment in this embodiment has completed functions, including food storage, food delivery and head rotation functions. The feeding equipment is designed reasonably, in which the direction of food particles delivery can be controlled, and the rotation is stable, thereby the user's experience could be greatly improved.

The structure of the storage device 20, the ejection device 30 and the rotation device 40 of the feeding equipment of this application are described in detail below, to gradually clarify the working principle of the whole machine of the feeding equipment.

Figure 4:
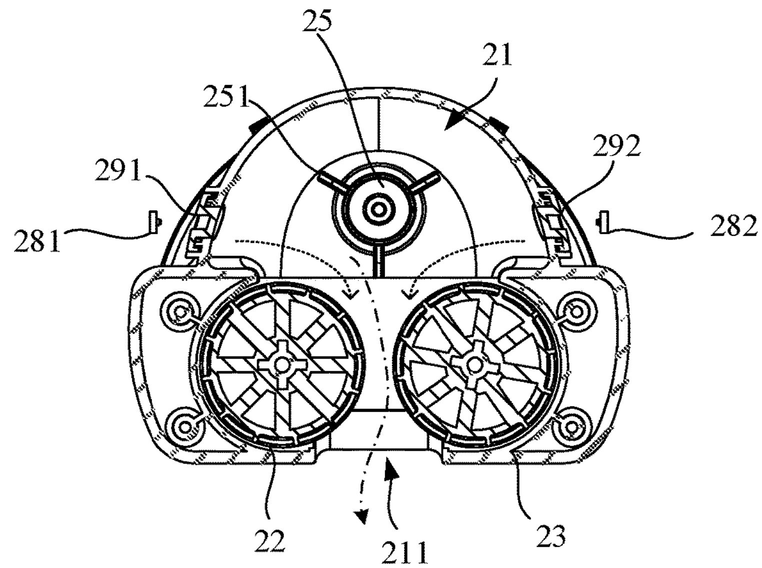
FIG. 4 is a cross-sectional diagram of the storage device shown in FIG. 3 along A-A direction.

Referring to FIG. 1 to FIG. 4, FIG. 3 is a schematic diagram of a storage device of an embodiment of the present application. FIG. 4 is a cross-sectional diagram of the storage device shown in FIG. 3 along the A-A direction.

In the existing feeding equipment, the storage device is usually set with rotating blades for driving the food particles to move, so that the food particles could fall into the discharge side from the gap between the blades during the rotation of the blades. Because the blades are fixed, the number of the falling food during the rotation is random, and the quantity cannot be controlled. Because the distance between adjacent blades are fixed, food particles of larger size are easily stuck between the blades and cannot be dropped. Another existing solution uses a slanting upward pusher to push the food particles into the discharge side. Since the cross-sectional area of the pusher is fixed, when the food particles are large, they tend to get stuck in the outlet side causing blockage, and when the food particles are small, multiple food particles will be pushed out at once, resulting in failure to eject. In addition, the storage cavity of the related technology is usually fixed in the feeding equipment and cannot be removed, which does not facilitate cleaning of the storage cavity.

Thus, in one embodiment, the storage device 20 of the feeding equipment includes a storage chamber 21, a storage channel, and a storage drive assembly 24. The storage chamber 21 is used to hold and store food particles, and the storage chamber 21 is provided with an outlet side 211 and an inlet side, wherein the user can load food particles into the storage cavity 21 through the inlet side, and the food particles leave the storage device 20 through the outlet side 211. The outlet channel is formed between at least two outlet wheels, the two outlet wheels are provided on the outlet side 211, and at least one outlet wheel is present as a resilient wheel. At least two outlet wheels are each connected to the outlet drive assembly 24, and driven by the storage drive assembly 24. The two adjacent outlet wheels rotate in opposite directions to drive the material toward the outlet side 211.

The storage device 20 is applied on a feeding equipment, so the aforementioned material can correspond to food particles. When the storage device 20 is applied on other kinds of devices, the material can also be other substances. As the name implies, the elastic wheel is elastic and capable of deformation. When the storage drive assembly 24 drives the two adjacent outlet wheels to rotate in opposite directions to drive the food particles through the outlet channel, the two elastic outlet wheels are capable of adaptive deformation. When food particles with different sizes pass through, the elastic wheels could deform to different degrees to enable different sizes of food particles to pass between the outlet wheels.

The outlet wheels are provided on the outlet side 211, the two discharge wheels are spaced apart from each other to form a discharge channel. The two discharge wheels are connected to the storage drive assembly 24. Driven by the storage drive assembly 24, the two discharge wheels rotate in opposite directions to drive the food particles towards the discharge side 211. The food particles are moved from the discharge channel towards the discharge side 211. The two discharge wheels are designed to move the food particles from the inlet side to the discharge side 211 via the discharge channel as the food particles pass by. Moreover, the minimum width of the discharge channel varies with the size of the food particles. In other words, at least one of the discharge wheels is a resilient wheel with elasticity. When the food particles pass from the discharge channel, the resilient wheel can deform to adopt different sizes of the food particles passing between the outlet wheels, and return to the original shape after the food particles passed by. The resilient wheels allow food particles with different sizes passing through the outlet channel.

In one embodiment, the resilient wheel is hollow inside to easy deformation. For example, one or more hollow portions are provided within the resilient wheel. Further, the outer periphery of the discharge wheel is convexly provided with a one or more stirring parts, and the stirring parts can drive the food particles in the storage chamber to move, so that the food particles can move from the outlet channel to the discharge side 211, and finally be discharged via the outlet side 211.

For example, the at least two discharge wheels include a rigid wheel and a resilient wheel. The rigid wheel is hard and does not easily deform. In general, the rigid wheel is not easily deformed, while the resilient wheel is easily deformed and can recover its original size and shape after deformation. The storage drive assembly 24 drives the rigid and resilient wheels to rotate in opposite directions to drive the food particles through the discharge channel. The resilient discharge wheel is capable of adaptive deformation to allow food particles of different sizes to pass between the rigid wheel and the resilient wheel.

Figure 5:
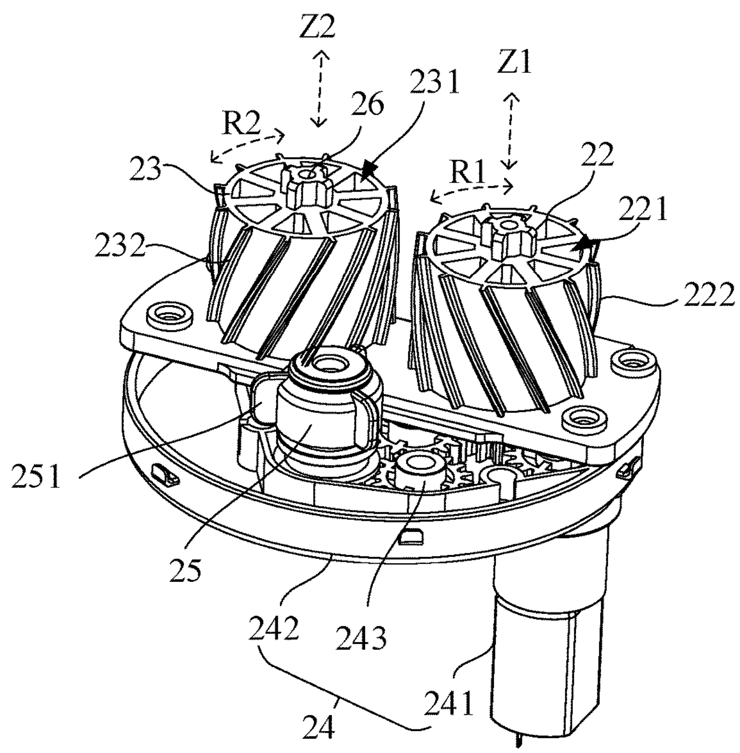
FIG. 5 is a schematic diagram of a storage drive assembly, a first resilient wheel, a second resilient wheel, and a mixing wheel of the present application.

Referring to FIG. 4 and FIG. 5, the at least two discharge wheels include a first resilient wheel 22 and a second resilient wheel 23, with a discharge channel being located between the two resilient wheels. The food particles are able to move through the discharge channel towards the discharge side 211. As the food particles pass through the discharge channel, both the first and second resilient wheel 22, 23 can be deformed so that food particles of different sizes can pass through.

The following is an example of at least two discharge wheels including the first resilient wheel 22 and the second resilient wheel 23.

The storage drive assembly 24 is provided in the housing assembly 10. The storage drive assembly 24 is connected to the first and second resilient wheels 22 and 23, respectively. The storage drive assembly 24 is used for driving the first and second resilient wheels 22 and 23 to rotate in opposite directions. The first and second resilient wheels 22 and 23 are rotatably provided on the discharge side 211, and the first and second resilient wheels 22 and 23 are spaced apart from each other. A discharge channel is formed between the first and the second elastic wheel 23 can drive the food particles to pass through the discharge channel to limit the number of food particles passing between them and avoid too many food particles falling into the discharge side 211 at one time.

As the name implies, the first elastic wheel 22 and the second elastic wheel 23 are elastic, which means they can recover its original size and shape after deformation. A minimum distance between the first elastic wheel 22 and the second elastic wheel 23 can change with the size of the food particles, that is, the minimum width of the discharge channel can change with the size of the food particles. When food particles of different sizes pass through, the first elastic wheel 22 and the second elastic wheel 23 can undergo different degrees of deformation. After the food particles pass through, the first elastic wheel 22 and the second elastic wheel 23 can restore the original size and shape.

In this embodiment, the first elastic wheel 22 and the second elastic wheel 23 can drive the food particles from the storage chamber 21 to the discharge side 211 by squeezing the food particles. The minimum distance between the first elastic wheel 22 and the second elastic wheel 23 can change with the size of the food particles. When different sizes of food particles pass through, the degree of deformation of the elastic wheel changes to fit different sizes of food particles.

Referring to FIG. 3 to FIG. 5, FIG. 5 is a schematic diagram of a storage drive assembly, a first resilient wheel, a second resilient wheel, a mixing wheel of the present application.

In one embodiment, the storage device 20 further comprises a mixing wheel 25 rotatably disposed in the storage cavity 21.

The mixing wheel 25 is provided with a mixing part 251 convexly on the outer surface of the mixing wheel 25, and when the mixing wheel 25 is rotated, the mixing part 251 can then rotate and poke the food particles in the storage cavity 21. In this embodiment, by rotating the mixing wheel 25 in the storage cavity 21, the food particles can be stirred to move continuously, and then the food particles could be driven by the first elastic wheel 22 and the second elastic wheel 23 to move towards the discharge side 211.

The structure of the first resilient wheel 22 and the second resilient wheel 23 of the present application, and how the first resilient wheel 22 and the second resilient wheel 23 drive the food particles to pass between them, are described below in connection with FIG. 5.

Specifically, the first resilient wheel 22 is provided with a first hollow portion 221 and the second resilient wheel 23 is provided with a second hollow portion 231, such that the first resilient wheel 22 and the second resilient wheel 23 are easily deformed when food particles passed by to facilitate the passage of an appropriate amount of food particles.

The first hollow portion 221 may run through the first elastic wheel 22 along the axial direction Z1 of the first elastic wheel 22, the second hollow portion 231 may run through the second elastic wheel 23 along the axial direction Z2 of the second elastic wheel 23. When the food particles passed by, the first elastic wheel 22 and the second elastic wheel 23 are easily deformed due to the presence of the first hollow portion 221 and the second hollow portion 231 to facilitate the passage of the food particles between them. Additionally or alternatively, the first hollow portion 221 and the second hollow portion 231 may also be other shapes, such as honeycomb, etc.

The number of first hollow sections 221 may be a plurality, and the plurality of first hollow sections 221 are spaced apart from each other along the circumference R1 and the radial direction (not identified in the figure) of the first resilient wheel 22. The number of second hollow sections 231 is a plurality, and the plurality of second hollow sections 231 are spaced apart from each other along the circumference R2 and the radial direction (not identified in the figure) of the second resilient wheel 23. The radial direction refers to the direction through the axis in the radial plane. The first resilient wheel 22 as well as the second resilient wheel 23 are susceptible to deformation when the first resilient wheel 22 and the second resilient wheel 23 are in different positions relative to each other to facilitate the passage of food particles between them. The radial direction of the first elastic wheel 22 is perpendicular to the axial direction Z1, and the radial direction of the second elastic wheel 23 is perpendicular to the axial direction Z2.

Further, the outer periphery of the first elastic wheel 22 is convexly provided with a first stirring portion 222, and the outer periphery of the second elastic wheel 23 is convexly provided with a second stirring portion 232. The first stirring portion 222 and the second stirring portion 232 are used to stir and drive the food particles to move.

The first stirring portion 222 extends along the axial direction Z1 of the first resilient wheel 22, and the second stirring portion 232 extends along the axial direction Z2 of the second resilient wheel 23. Wherein, the axial direction Z1 of the first elastic wheel 22 and the axial direction Z2 of the second elastic wheel 23 face the same direction.

Additionally or alternatively, the first stirring section 222 may be inclined at an angle to the axial direction Z1 of the first resilient wheel 22, and the second stirring section 232 may be inclined at an angle to the axial direction Z2 of the second resilient wheel 23, and it is not strictly required that the first stirring section 222 and the second stirring section 232 extend along the axial direction Z1 of the first resilient wheel 22 and the axial direction Z2 of the second resilient wheel 23, respectively.

When the first resilient wheel 22 and the second resilient wheel 23 are properly assembled, the first and second stirring portion 232 are tilted in an oblique upward direction. Both of them are away from the ejection device 30 and toward the position where the discharge side 211 of the storage cavity 21 is located.

Additionally or alternatively, the first stirring section 222 may be inclined at an angle to the axial direction Z1 of the first resilient wheel 22, and the second stirring section 232 may be inclined at an angle to the axial direction Z2 of the second resilient wheel 23, and it is not strictly required that the first stirring section 222 and the second stirring section 232 extend along the axial direction Z1 of the first resilient wheel 22 and the axial direction Z2 of the second resilient wheel 23, respectively.

Additionally or alternatively, the first toggle portion 222 and the second toggle portion 232 may also be a star, square, round, or other shapes attached to the surfaces of the resilient wheels and protruding thereof.

Referring to FIG. 4, rotating directions of the first resilient wheel 22 and the second resilient wheel 23 are as indicated in FIG. 4. Food particles pass between the two wheels and have a tendency to move toward the discharge side 211. The dotted lines in FIG. 4 are used to indicate the path of movement of the food particles.

The two wheels can be flexible, etc. The first elastic wheel 22 and the second elastic wheel 23 could have a same appearance and structure to facilitate production and save production costs. Of course, the appearance and structure of the two wheels can also be different and will not be limited here.

Further, gaps could be formed between the two wheels and the cavity wall of the storage cavity 21, the gaps should be less than the minimum width of the food particles so as to avoid food particles falling into the ejection device 30 from the gaps rather than the outlet channel, thus the number of food particles falling into the ejection device 30 could be well controlled. Further, when the two elastic wheels are not deformed, the gap between them should be smaller than the minimum width of the food particles food particle size, so as to avoid that food particles entering the ejection device 30 through the gap directly without squeezing the wheels. For example, the height of the two wheels can range between 15-30 mm, and the gap between the two wheels can ranges between 4-8 mm. It should be noted that the above-mentioned ranges are for example only and are not meant to limit the specific implementation.

Figure 6:
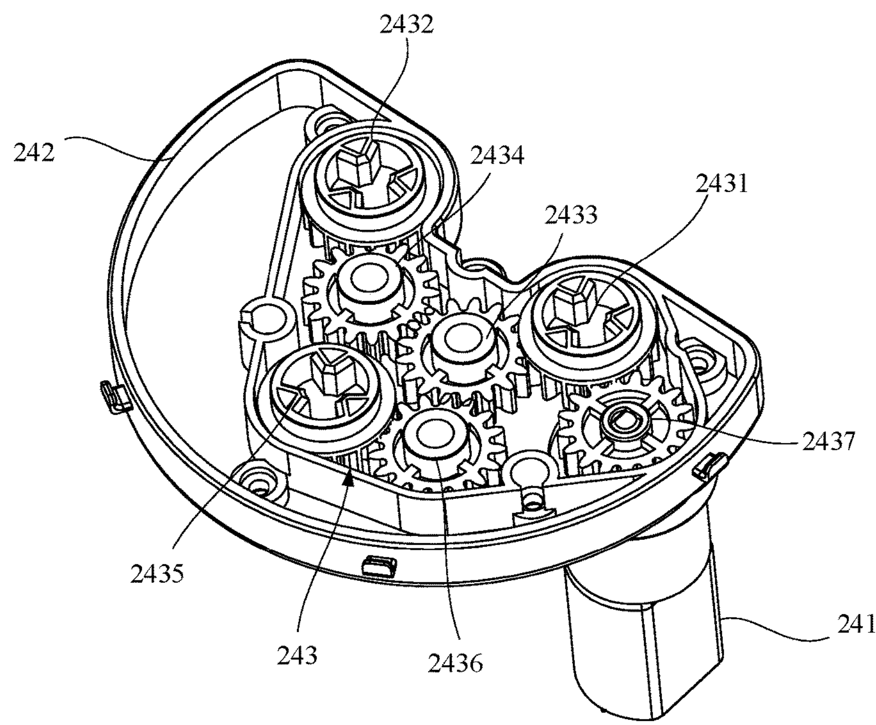
FIG. 6 is a schematic diagram of the storage drive assembly of an embodiment of the present application.

Referring to FIG. 5 and FIG. 6, FIG. 6 is a schematic diagram of the storage drive assembly of an embodiment of the present application.

In one embodiment, the storage drive assembly 24 includes a drive member 241, a gear holder 242, and a plurality of drive gears 243. The drive member 241 and the plurality of drive gears 243 are provided in the gear holder 242, and the drive member 241 is connected to the plurality of drive gears 243.

Further, the first resilient wheel 22, the second resilient wheel 23, and the mixing wheel 25 are each connected to a different drive gear 243. The drive gear 243 connected to the first resilient wheel 22 and the drive gear 243 connected to the second resilient wheel 23 are connected to each other by an even number of drive gear 243 to enable the two wheels to rotate in opposite directions.

For example, as illustrated in FIG. 6, the plurality of drive gears 243 includes a first driven gear 2431, a second driven gear 2432, a third driven gear 2433, a fourth driven gear 2434, a fifth driven gear 2435, a sixth driven gear 2436, and an active gear 2437. The active gear 2437 is connected to an output end of the drive member 241, the first driven gear 2431 is engaged with the active gear 2437 and connected to the first flexible wheel 22, the second driven gear 2432 is connected to the second flexible wheel 23, the first driven gear 2431 and the second driven gear 2432 are connected to each other through the third driven gear 2433 and the fourth driven gear 2434 in turn, the fifth driven gear 2435 is connected to the mixing wheel 25 and the fifth driven gear 2435 is connected to the third driven gear 2433 through the sixth driven gear 2436, the fifth driven gear 2435 is connected to the mixing wheel 25, and the fifth driven gear 2435 is connected to the third driven gear 2433 through the sixth driven gear 2436.

It should be noted that the fifth driven gear 2435 connected to the mixing wheel 25 does not necessarily need to be connected to the third driven gear 2433 through the sixth driven gear 2436. The drive gear 243 connected to the mixing wheel 25 can also engage with other drive gear 243 to enable the mixing wheel 25 to rotate and stir the food particles. The rotating direction of the mixing wheel 25 does not need to be limited. Among them, the above first driven gear 2431 to the sixth driven gear 2436 is only for example, not to limit the specific implementation, and can be adjusted according to the actual environment in practice.

Figure 7:
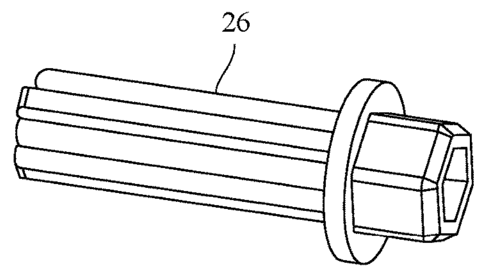
FIG. 7 is a schematic diagram of the drive shaft of an embodiment of the present application.

The first resilient wheel 22 and the second resilient wheel 23 can also be connected to the drive gear 243 via a drive shaft 26, where the drive shaft 26 can be a "hexagonal-cross" drive shaft (as shown in FIG. 7), etc., without limitation here. Specifically, the "hexagonal-cross" drive shaft, for example, has a cross-section of "ten" on one side and a hexagonal cross-section on the other side, one side of which can be threaded with the first elastic wheel 22 and the second elastic wheel 23, and the other side can be connected to the drive gear 243. The other side is connected to the drive gear 243.

The drive member 241 may be a DC drive motor, to drive the drive gear 243 to rotate. The plurality of drive gears 243 are connected to the first elastic wheel 22, the second elastic wheel 23, and the mixing wheel 25, respectively, so that the drive member 241 can drive the first elastic wheel 22, the second elastic wheel 23, and the mixing wheel 25 to rotate through the drive gear 243.

Figure 8:
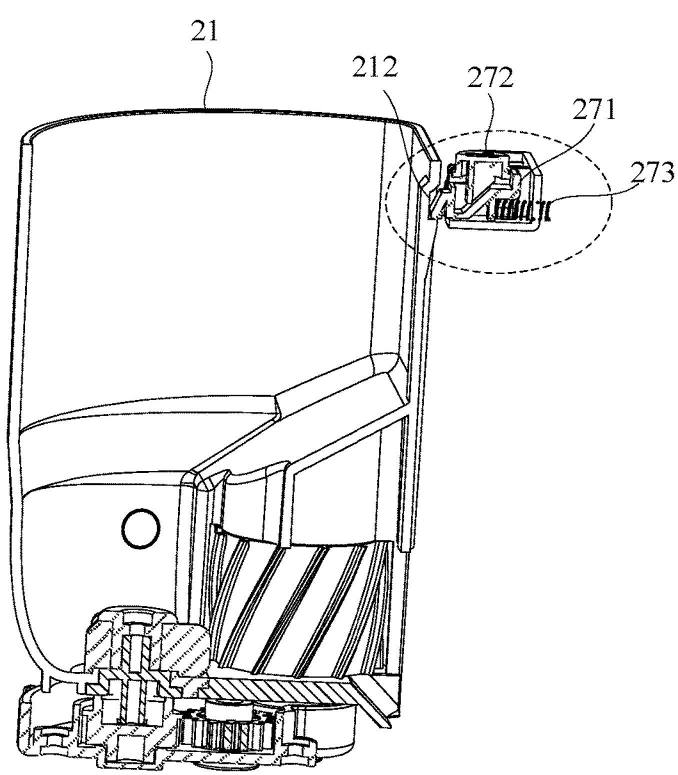
FIG. 8 is a cross-sectional diagram of the storage device shown in FIG. 3 along the B-B direction.
Figure 9:
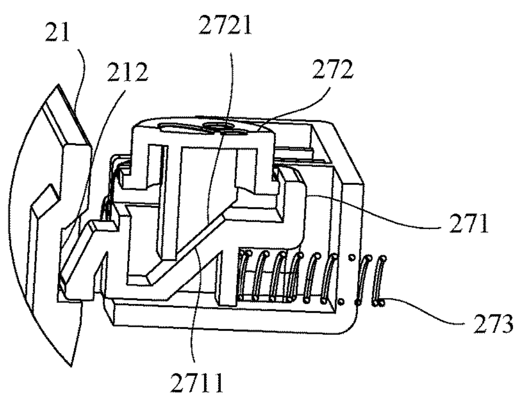
FIG. 9 is a partially enlarged diagram of the storage device shown in FIG. 8.

Refer to FIG. 1, FIG. 2, FIG. 8, and FIG. 9, FIG. 8 is a cross-sectional diagram of the storage device shown in FIG. 3 along the B-B direction, FIG. 9 is a partially enlarged diagram of the storage device shown in FIG. 8.

The food particles are stored in the storage cavity 21, if the storage cavity 21 is not cleaned and disinfected for a long time, it will easily accumulate foreign matter and bacteria inside. Thereby, in one embodiment, the storage cavity 21 of the present application is removably provided in the housing assembly 10 (as shown in FIG. 1), so that it can be easily removed.

Specifically, the storage device 20 has a locked state and an open state. When the storage device 20 is in the locked state, the storage cavity 21 is fixed relative to the housing assembly 10 to avoid the movement of the storage cavity 21 within the housing assembly 10, thus ensuring the safety of the feeding equipment. When the storage device 20 is in the open state, the storage cavity 21 can be removed from the housing assembly 10 to facilitate the user to clean the storage cavity 21.

The storage device 20 includes a locking member 271, a locking drive member 272, and an elastic member 273. The locking member 271 is connected to a side of the housing assembly 10 toward the storage device 20 through the elastic member 273. The locking member 271 is provided with a first bevel 2711 toward the storage cavity 21. The locking drive member 272 is provided with a second bevel 2721 back from the storage device 20. The first bevel 2711 and the second bevel 2721 are provided in close proximity. When the locking drive member 272 is moved by an external force, the second bevel 2721 can push the first bevel 2711 to push the locking member 271 to compress the elastic member 273, causing the storage device 20 to switch from the locked state to the open state, thus the storage chamber 21 can be taken out. When the external force on the locking drive member 272 disappears, the elastic return force of the elastic member 273 makes the locking member 271 push the locking drive member 272 to reset.

The resilient member 273 can be a spring or the like, without limitation herein.

Further, the surface of the storage cavity 21 toward the locking member 271 is provided with a buckling slot 212. As illustrated in FIG. 8 and FIG. 9, the extension direction and the movement direction of the locking member 271 is perpendicular to the height direction X of the feeding equipment (as shown in FIG. 2), and the extension direction and the movement direction of the locking drive member 272 is the height direction X of the feeding equipment. Specifically, the locking member 271 can move with the locking drive member 272 in the height direction X of the feeding equipment so as to be selectively embedded in the locking slot 212. When the storage device 20 is in the locked state, the locking member 271 is embedded in the locking slot 212, and the storage device 20 is fixed to the feeding equipment. When the storage device 20 is in the open state, the locking member 271 is detached from the groove 212, and the storage chamber 21 can be removed at this time. During installation, the locking member 271 is attached to the storage chamber 21, and when the locking slot 212 passes the latching member 271, the elastic return force of the elastic member 273 makes the locking member 271 embedded in the locking slot 212, thus locking the storage device 20.

Referring to FIG. 2 as well as FIG. 4. In one embodiment, to detect remaining amount of food particles in the storage chamber 21, the storage device 20 further includes a signal transmitter 281 and a signal receiver 282 for detecting whether there are less than a predetermined amount of food particles in the storage chamber 21. The signal emitted by the signal transmitter 281 is transmitted to the signal receiver 282 via the storage chamber 21.

The signal transmitter 281 and the signal receiver 282 are provided on opposite sides of the storage chamber 21. In alternative embodiments, the signal transmitter 281 and the signal receiver 282 can also be in other positions, for example, the signal transmitter 281 and the signal receiver 282 are located on a same side, and by setting a reflector to reflect the signal, etc., so that the signal receiver 282 can receive the signal emitted by the signal transmitter 281 when the food particles are insufficient, and avoid receiving the signal when the food particles are sufficient.

The signal transmitter 281 and the signal receiver 282 can be infrared optocoupler, etc. The infrared optocoupler is a detector consisting of an infrared transmitter tube and a receiver tube. The receiver tube received an infrared signal sent from the infrared transmitter tube, and the signal will be interrupted when the infrared light is blocked.

When the remaining food particles in the storage cavity 21 cannot reach the position of the signal transmitter 281 and the signal receiver 282, a signal bridge is built up between the receiver 282 and the signal transmitter 281, such as infrared signal, etc., which shows that there are no enough food particles stored in the storage chamber 21, and an alert message can be sent to the user, so that the user can replenish the food particles to the feeding equipment in time. Wherein, the signal transmitter 281 and signal receiver 282 are positioned in a same height, when the remaining food particles in the storage chamber 21 reaches the same height with the signal transmitter 281, the amount of the food particles equals the preset amount.

Further, in order to facilitate the signal transmission from the signal transmitter 281 to the signal receiver 282, the feeding equipment also includes a first window 291 and a second window 292, the first window 291 and the second window 292 are provided on opposite sides of the storage cavity 21, wherein the first window 291 and the second window 292 are transparent to facilitate signal transmission. When the storage chamber 21 is installed in the feeding equipment 20, the signals emitted by the signal transmitter 281 pass through the first window 291, the second window 292 and the signal receiver 282 in turn.

It can be seen that when the stirring wheel of the storage device rotates, the stirring portion can poke the food particles in the storage chamber toward the first and second elastic wheels, and the first poking part of the first elastic wheel and the second poking part of the second elastic wheel can poke and squeeze the food particles, so that the food particles pass between them and fall into the ejection device and ejected to the outside by the ejection device.

The structure and the principle of the ejection device 30 will be described below.

Figure 10:
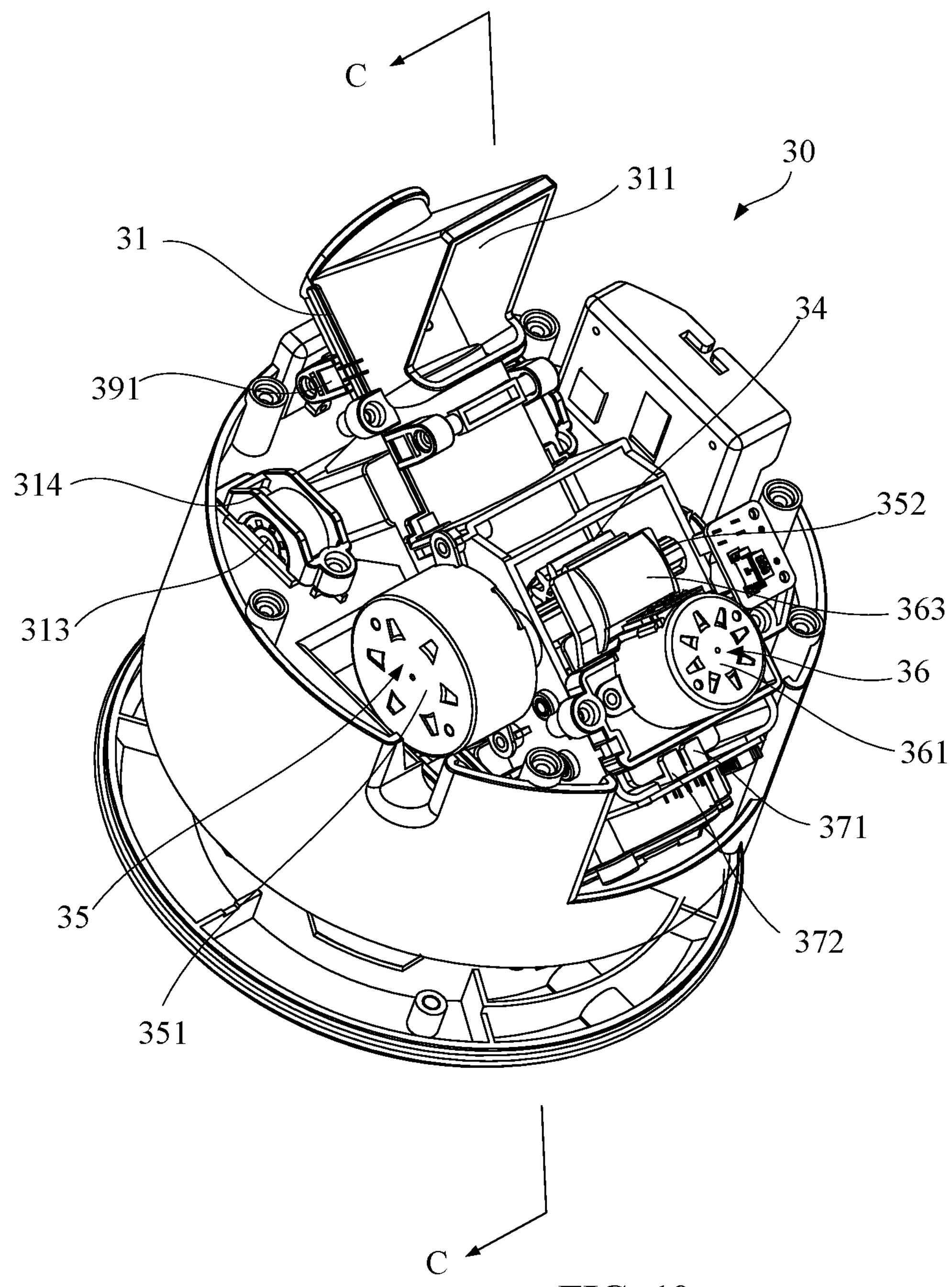
FIG. 10 is a schematic diagram of the ejection device of an embodiment of the present application.
Figure 11:
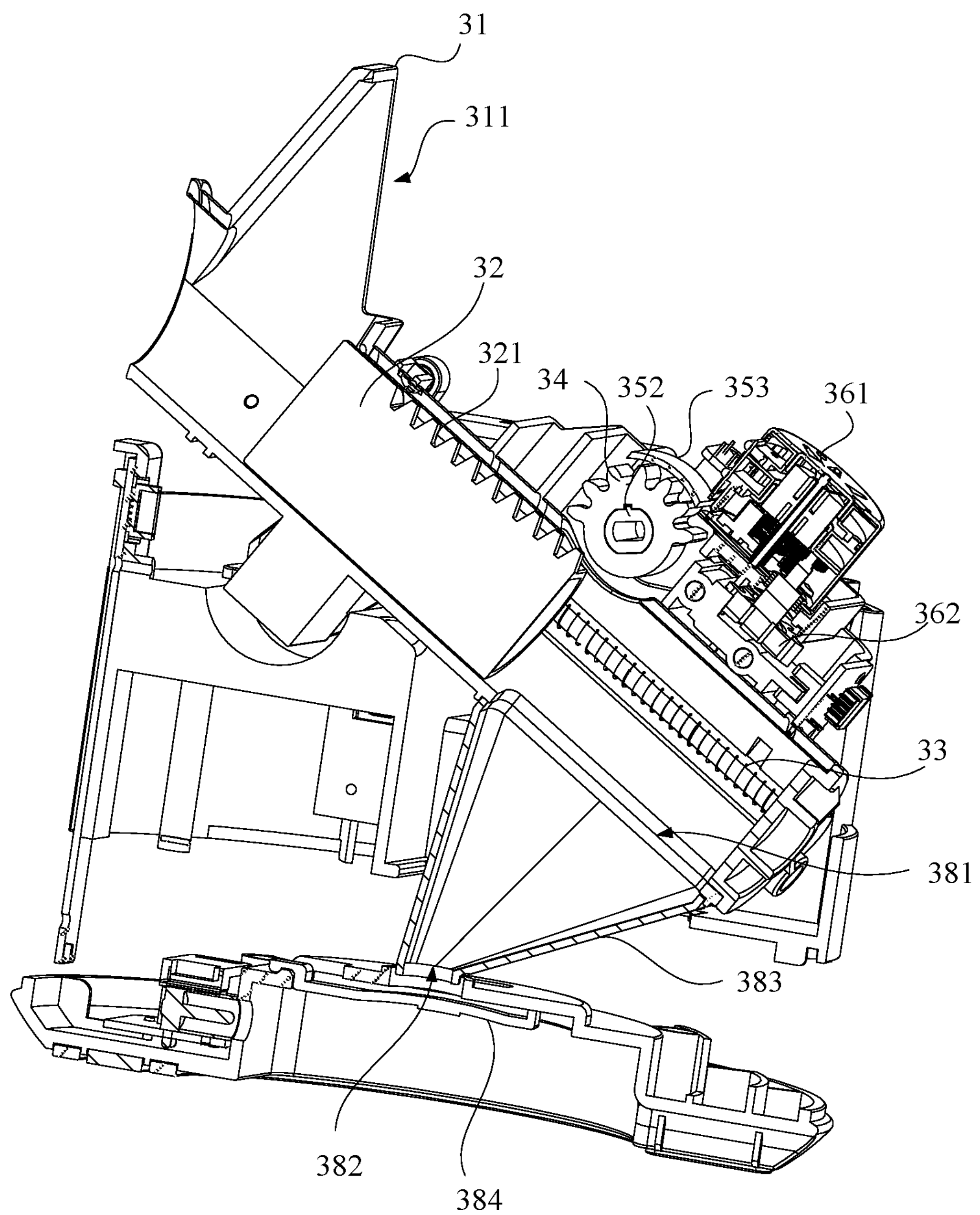
FIG. 11 is a cross-sectional diagram of the ejection device shown in FIG. 3 along B-B direction.

Referring to FIG. 2, FIG. 10, and FIG. 11 in combination, FIG. 10 is a schematic diagram of the ejection device of an embodiment of the present application. FIG. 11 is a cross-sectional diagram of the ejection device shown in FIG. 3 along the B-B direction.

The present invention aims to solve the technical problem that the ejection distance of the ejection device 30 is not changeable in the related technology. In one embodiment, the ejection device 30 and the storage device 20 are provided sequentially along the height direction X of the feeding equipment, and the ejection device 30 includes an ejection chamber 31, an ejection member 32, an elastic member 33 (e.g., a spring), an ejection gear 34, and a first ejection drive assembly 35.

The ejection chamber 31 is provided in the housing assembly 10 and connected to the storage device 20, and the food particles in the storage chamber 21 (as shown in FIG. 3) can fall into the ejection chamber 31 through the discharge side 211. The ejection member 32 is provided in and connected to the ejection chamber 31 by the elastic member 33, and the ejection member 32 is connected to a drive rack 321.

The ejection gear 34 of the ejection device 30 includes a body 341 and an engagement zone and a gearless zone 343 disposed on the outer periphery of the body 341; as the name implies, the engagement zone has engagement teeth while the gearless zone 343 does not have engagement teeth. The ejector gear 34 is connected to the first ejector drive assembly 35, i.e., the body 341 is connected to the first ejector drive assembly 35, and the first ejector drive assembly 35 is capable of rotating the ejector gear 34 with the drive rack 321 selectively engaging the engagement zone. During the rotation of the ejection gear 34, the engagement zone engages the drive rack 321 or the gearless zone 343 disengages from the engagement zone. Thus, in this embodiment, during the rotation of the ejection gear 34, when the engagement area of the ejection gear 34 is facing the driving rack 321, the engagement area engages with the driving rack 321, i.e., the ejection gear 34 is connected to the ejection member 32, and the ejection gear 34 rotates and drives the ejection member 32 to compress the elastic member 33. Or, when the toothless area 343 of the ejection gear 34 is facing the driving rack 321 of the ejection member 32, the ejection member 32 disengages from the ejection gear 34 and the elastic return force of the elastic member 33 drives the ejection member 32 to eject the food particles to the outside, reducing the loss of ejection force during the ejection process.

Figure 12A:
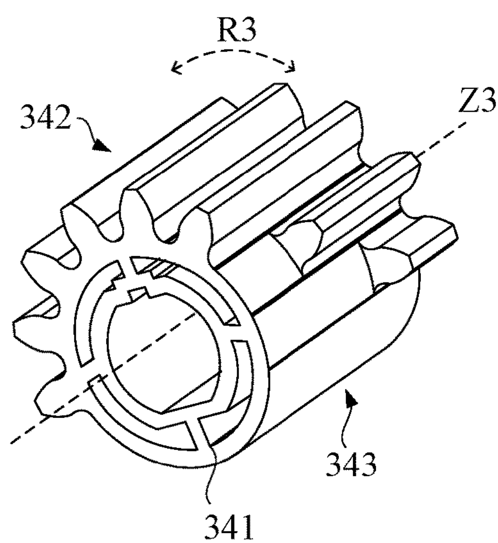
FIGS. 12A-12D are schematic diagrams of the ejection gear of the present application.

Please continue to refer to FIG. 2, FIG. 10, and FIG. 11 in conjunction. In one embodiment, the engagement zone includes at least two sets of engagement groups 342 (as shown in FIG. 12A), the body 341 and the first ejection drive assembly 35 are connected, the at least two sets of engagement groups 342 are provided sequentially along the axial direction Z3 of the body 341, each engagement group 342 includes a number of engagement teeth, and a number of engagement teeth of each engagement group 342 are provided sequentially along the circumferential direction R3 of the body 341. Therein, the toothless zone 343 is located between the first and last two engagement teeth of the engagement group 342 on the circumferential R3 of the body 341.

A number of engagement teeth of each engagement group 342 have different lengths along the circumference R3 of the body 341. When the first ejection drive assembly 35 drives the ejection gear 34, the engagement teeth engage with the drive rack 321, the ejection gear 34 moves the ejection member 32 and the resilient member 33 is in compression. When the toothless region 343 of the ejection gear 34 is facing the ejection member 32, the engagement group 342 no longer engages with the drive rack 321, i.e., the ejection member 32 is disengaged from the ejection gear 34 and the resilient response force pushes the ejection member 32 within the ejection chamber 31, i.e., allowing the ejection member 32 to eject to eject the food particles away from the feeding equipment.

Further, the ejection device 30 further includes a second ejection drive assembly 36 provided in the ejection chamber 31, and the second ejection drive assembly 36 is connected to the ejection gear 34. The second ejection drive assembly 36 drives the ejection gear 34 to move, and the moving direction is perpendicular to the extension direction of the drive rack 321, to facilitate the connection between drive rack 321 and different engagement groups 342.

The second ejection drive assembly 36 is connected to the ejection gear 34 for driving the ejection gear 34 along its axial direction Z3 (as shown in FIG. 12A), causing the engagement gear set 342 to selectively engage with the drive rack 321. Different engagement lengths of different engagement groups 342 vary, and when the ejection gear 34 engages with different engagement groups 342, the degree of compression of the elastic member 33 varies, corresponding to different ejection forces, enabling the ejection device 30 to provide different ejection distances.

The ejection member 32 is provided in the ejection cavity 31 and is connected to the ejection cavity 31 by a resilient member 33. The body 341 of the ejection gear 34 is connected to a first ejection drive assembly 35, and the ejection member 32 is provided with a drive rack 321. At least two engagement groups 342 provided on the outer periphery of the body 341 selectively engage with the drive gear 362. When the food particles in the storage device 20 fall into the ejection chamber 31, the first ejection drive assembly 35 drives the ejection gear 34 to rotate, driving the ejection member 32 to compress the elastic member 33, and when the ejection gear 34 rotates to the toothless area 343, the ejection gear 34 disengages from the drive rack 321, at which time the elastic restoring force of the elastic member 33 can be converted to a driving rack 321. The elastic return force of the elastic member 33 can be converted into the ejection force of the ejection member 32 to eject the food particles.

Moreover, a number of engagement teeth of each engagement group 342 have different lengths on the circumferential R3 of the body 341 of the ejection gear 34, and the second ejection drive assembly 36 connects the ejection gear 34 to drive the ejection gear 34 along the axial Z3 of the ejection gear 34 such that each engagement group selectively engages the drive rack 321. In this way, when the drive rack 321 is engaged with each engagement group 342 of different lengths respectively, it moves in the ejection chamber 31 at different distances, which means that the degree of compression of the elastic member 33 is also different, and the elastic reversion force of the elastic member 33 converts to different ejection strengths, i.e., the ejection device 30 is able to provide multiple ejection strengths to vary the ejection distance of the food particles.

Referring to FIGS. 12A-12D, which are schematic diagrams of the structure of the ejection gear of the present application. Part of the engagement teeth of the ejection gear 34 are common to each engagement group 342, thus simplifying the structure of the ejection gear 34 and helping to reduce the size of the ejection gear 34.

Figure 12B:
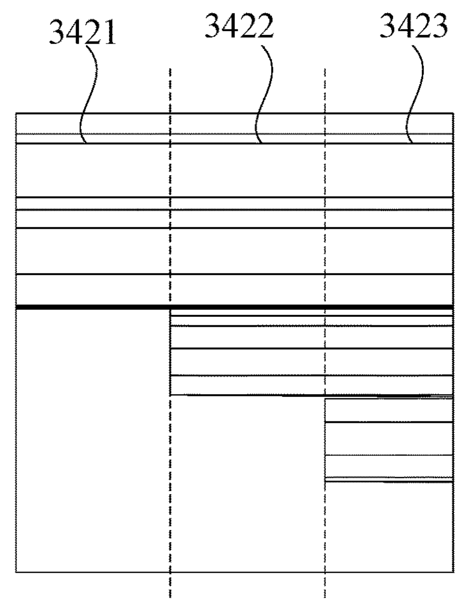

The at least two engagement groups 342 may include a first engagement group 3421, a second engagement group 3422, and a third engagement group 3423 provided along the axial Z3 of the body 341 of the ejection gear 34. Specifically, as illustrated in FIG. 12B, the respective engagement teeth of the first engagement group 3421, the second engagement group 3422, and the third engagement group 3423 are connected to simplify the structure of the ejection gear 34 simple and easy manufacture.

Figure 12C:
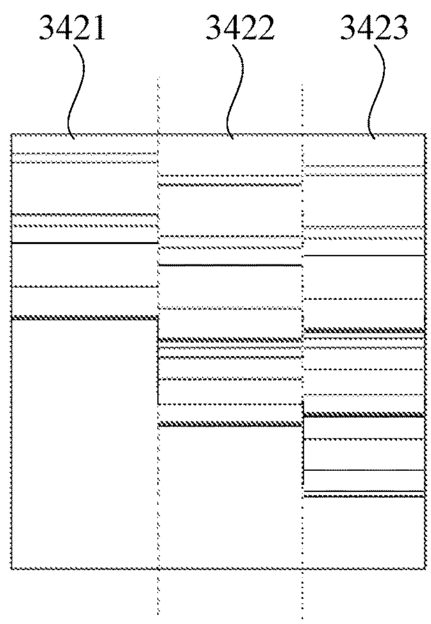
Figure 12D:
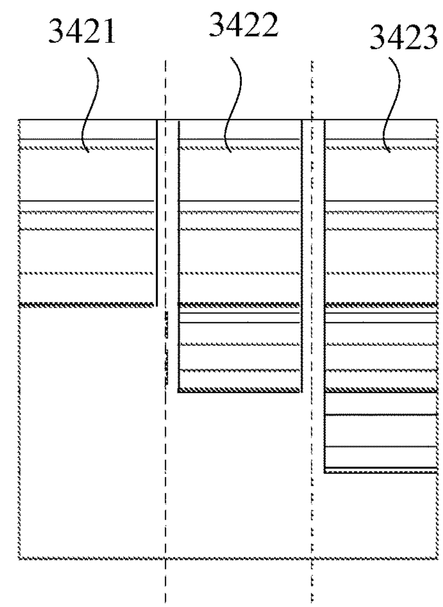

The respective engagement teeth of the first engagement group 3421, the second engagement group 3422, and the third engagement group 3423 are not connected, that is, any adjacent engagement teeth are independent of each other, they could be staggered (as shown in FIG. 12C) or spaced apart (as shown in FIG. 12D), etc., without limitation herein.

Figure 13:
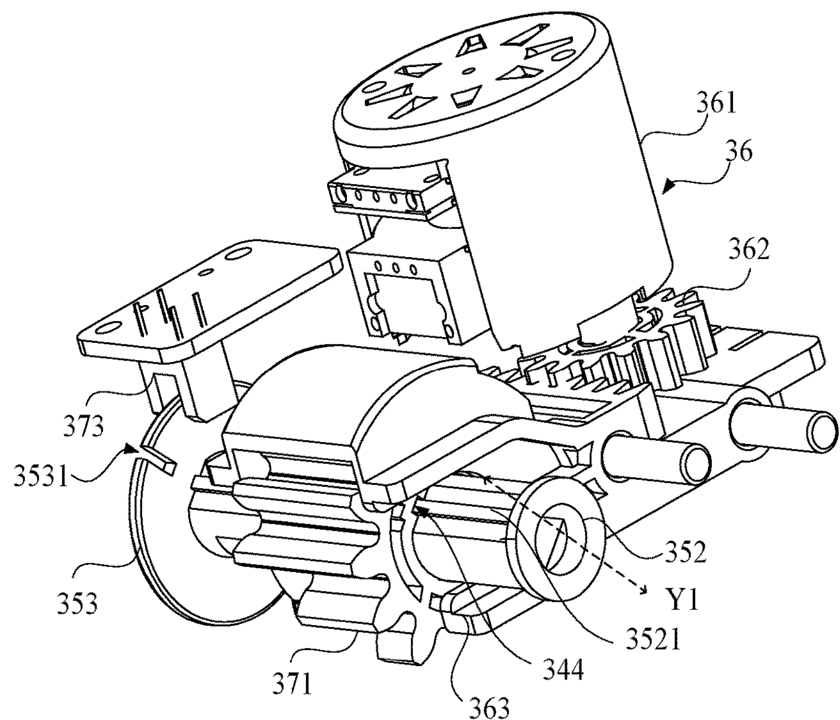
FIG. 13 is a schematic diagram of a drive shaft, a positioning member, a sensing assembly, a second ejection drive assembly, and an ejection gear of an embodiment of the present application.

Referring to FIG. 10, FIG. 11, and FIG. 13, FIG. 13 is a schematic diagram of a drive shaft, a positioning member, a sensing assembly, a second ejection drive assembly, and an ejection gear of an embodiment of the present application.

In one embodiment, the first ejection drive assembly 35 includes a drive member 351 and a drive shaft 352. The drive member 351 is provided in the ejection chamber 31 and connected to the body 341 of the ejection gear 34 via the drive shaft 352. The drive shaft 352 is driven to rotate by the drive member 351. The body 341 is driven to rotate by the drive shaft 352, thereby driving the ejection gear 34 to rotate, i.e., the drive member 351 drives the body 341 to rotate.

The drive member 351 can be a motor, etc., such as a 35 OD permanent magnet stepper motor, etc., without limitation herein.

Further, the second ejection drive assembly 36 includes a drive member 361, a drive gear 362, and a moving member 363. The drive member 361 is provided in the ejection chamber 31 and is connected to the drive gear 362, i.e., the drive member 361 is capable of rotating synchronously with the drive gear 362. The moving member 363 is provided with a moving rack 3631 that engages with the driving gear 362, and the ejection gear 34 is mounted on the moving member 363. The driving member 361 drives the moving member 363 to move along the driving axis 352, which in turn drives the ejection gear 34 to move along the driving axis 352, so that the driving rack 321 of the ejection member 32 engages with a different set of engagement teeth 342, thus providing different ejection forces and producing different ejection distances.

Wherein, the drive member 361 may be a motor, etc., such as a 24 OD permanent magnet stepper motor, etc., without limitation herein.

Further, in order to define the docking position of the ejection gear 34 so that each engagement group 342 selectively engages the drive rack 321 of the ejection member 32, the second ejection drive assembly 36 is provided with open slots.

Figure 14:
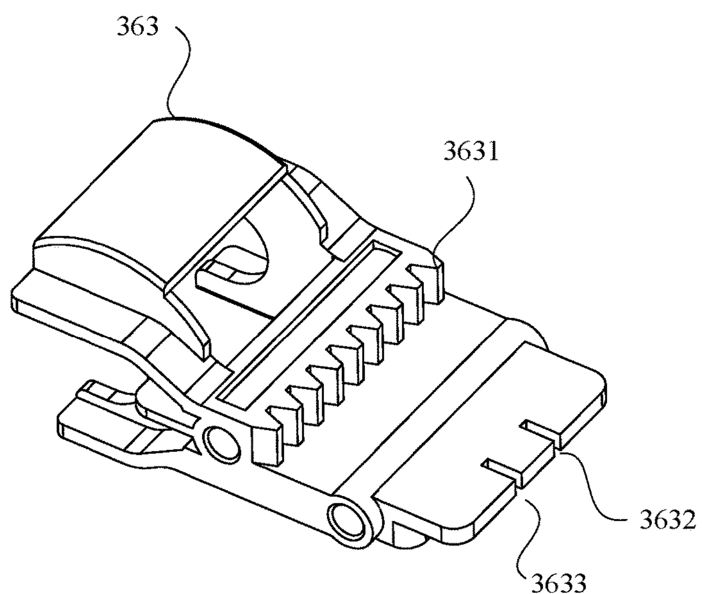
FIG. 14 is a schematic diagram of a mobile member of an embodiment of the present application.

The moving member 363 is provided with a first slot 3632 and a second slot 3633 spaced from each other (as shown in FIG. 14), correspondingly, the ejection device 30 includes sensing assemblies 371 and 372. When the first slot 3632 moves to the sensing assembly 371, and the second slot 3633 moves to the sensing assembly 372, the engagement teeth of the second engagement group 3422 are capable of engaging the drive rack 321. When the first slot 3632 moves to the sensing assembly 372, the engagement teeth of the first engagement group 3421 are capable of engaging the drive rack 321. When the second slot 3633 moves to the sensing assembly 371, the engagement teeth of the third engagement group 3423 are capable of engaging the drive rack 321. When the second slot 3633 moves to the sensing assembly 372, the teeth of the third gear set 3423 are able to engage with the drive rack 321.

Figure 15:
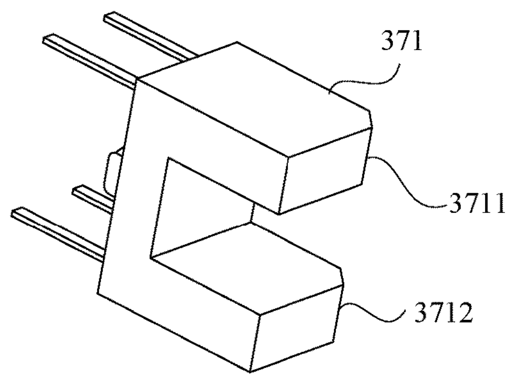
FIG. 15 is a schematic diagram of the sensing assembly of an embodiment of the present application.

The sensing assemblies 371 and 372 of the ejection device 30 can be an optocoupler, etc. Each sensing assembly 371 includes a transmitter tube 3711 and a receiver tube 3712 (as shown in FIG. 15).

Specifically, for example, when the first slot 3632 moves with the moving member 363 to the sensing assembly 372, the sensing assembly 371 is blocked while the sensing assembly 372 is not, i.e., the receiving tube 3712 of the sensing assembly 371 cannot receive the signal emitted by the transmitting tube 3711 of the sensing assembly 371, and the receiving tube of the sensing assembly 372 is capable of receiving the signal emitted by the transmitting tube of the sensing assembly 372, at which point the moving member 363 is docked to enable the first engagement set 3421 to engage the ejection member 32.

In an alternative embodiment, the moving member 363 is provided with three slots spaced apart from each other and the ejection device 30 includes a set of sensing components. When the three different slots are detected, the ejection device 30 controls the ejection gear 34 to stop at three different positions. The drive rack 321 of the ejection member 32 can engage with different engagement groups 342 of the ejection gear 34, thus changing the ejection force of the ejection device 30.

In another alternative embodiment, the at least two engagement groups 342 include a first engagement group and a second engagement group arranged along the axial direction Z3 of the body 341, the moving member 363 is provided with a first slot and a second slot spaced apart from each other, and the ejection device 30 includes a set of sensing components. When the two different slots are detected, the ejection device 30 controls the ejection gear 34 to stop at two different positions. The drive rack 321 of the ejection member 32 can engage with different engagement groups 342 of the ejection gear 34, thus changing the ejection force of the ejection device 30.

In another alternative embodiment, the at least two engagement groups 342 include a first engagement group and a second engagement group arranged along the axial direction Z3 of the body 341, the moving member 363 is provided with one slot, and the ejection device 30 includes a first sensing component and a second sensing component. When the two different slots are detected, the ejection device 30 controls the ejection gear 34 to stop at two different positions. The drive rack 321 of the ejection member 32 can engage with different engagement groups 342 of the ejection gear 34, thus changing the ejection force of the ejection device 30.

Please continue to refer to FIG. 10, FIG. 11, and FIG. 13 in conjunction. In one embodiment, the first ejection drive assembly 35 further comprises a positioning member 353. The positioning member 353 is provided on the drive shaft 352 and has a third slot 3531 extending along the radial Y1 of the drive shaft 352 (as shown in FIG. 13). The ejection device 30 further comprises a sensing assembly 373, a detection signal of the sensing assembly 373 is on a rotation path of the third slot 3531.

Specifically, when the ejector gear 34 rotates to the toothless area 343, the ejector member 32 disengages from the ejector gear 34 to eject the food particles. The drive member 351 drives the ejection gear 34 to continue rotating, and the positioning member 353 rotates accordingly. When the third slot 3531 of the positioning member 353 moves to the sensing assembly 373, the ejection gear 34 rotates to the toothless zone 343, and the teeth of the engagement group 342 do not engage with the drive rack 321, at which time the drive member 351 stops working. When food particles fall into the ejection chamber 31 again, the drive member 351 drives the ejection gear 34 to repeat the action of ejecting the food particles.

When the third slot 3531 moves to the sensing assembly 373, the engagement teeth of the engagement group 342 are not engaged with the drive rack 321, i.e., the ejection gear 34 is in a disengaged state from the ejection member 32 to ensure that the degree of compression of the ejection member 32 is not affected the next time the food particles fall in. It is easy to understand that if the engagement teeth of the engagement gear group 342 engage with the drive rack 321 when the third slot 3531 moves to the sensing assembly 373, i.e., if the ejection gear 34 engages with the ejection member 32, when the food particles fall into the ejection chamber 31 again, the rotating path of the engagement group 342 will be shorten, and decreases the compression of the elastic member 33 and affects the ejection force of the ejection device, resulting in a smaller ejection force.

The drive shaft 352 is provided with a mounting section 3521 and the ejection gear 34 is provided with a mounting slot 344, while the positioning member 353 is also provided with a mounting slot (not shown in the figure), so that the drive shaft 352, the ejection gear 34 and the positioning member 353 can have a relatively fixed position to easy assembly. Further, the drive shaft 352 and the ejection gear 34 may be provided with opposing abutting surfaces (not identified in the figure) to enable the drive shaft 352 and the ejection gear 34 to be connected stably to avoid wobbling during rotation. The abutting surfaces may be provided on opposing sides of the drive shaft 352 and on opposing sides of the inner ring of the ejection gear 34, respectively. A mounting part 3521 can be provided on the abutting surface of one side of the drive shaft 352, and the mounting slot 344 can be provided on the abutting surface of one side of the ejection gear 34.

Figure 16:
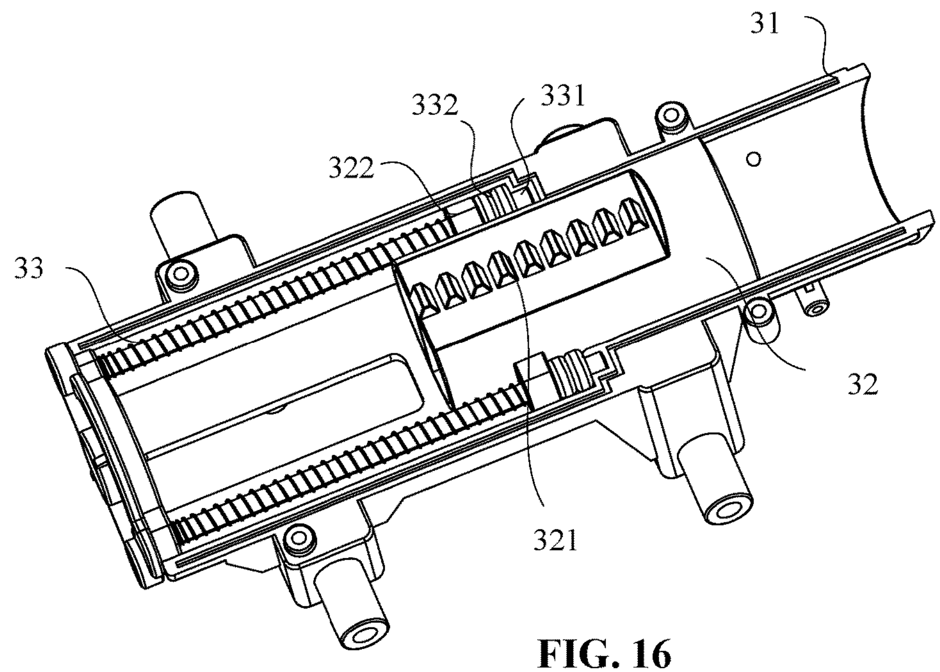
FIG. 16 is a schematic diagram of an ejection member, an elastic member and part of the ejection cavity of an embodiment of the present application.

The following specifies how the ejection chamber 31 is connected to the ejection chamber 31 by the elastic member 33. Referring to FIG. 10, FIG. 11, and FIG. 16 in combination, FIG. 16 is a schematic diagram of an ejection member, an elastic member and part of the ejection cavity of an embodiment of the present application.

In one embodiment, the outer peripheral surface of the ejector member 32 is convexly provided with an attachment portion 322. One end of the elastic member 33 is attached to the attachment portion 322 and the other end is attached to the ejection chamber 31, so that the ejection member 32 can be connected to the ejection chamber 31 by the elastic member 33. The elastic member 33 can be compressed by the attachment portion 322 when the driving rack 321 of the ejection member 32 is moved by the engaging group 342 of the ejection gear 34.

Further, the elastic member 33 can be provided in a guide rail 331, that is, one end of the guide rail 331 is against the ejection chamber 31, and the other end is penetrated in the abutting part 322 of the ejection member 32. The abutting part 322 can move along the guide rail 331, so that the elastic member 33 can move stably.

Further, the ejection device 30 also includes a protection member 332, the protection member 332 is provided on the side of the abutting part 322 not abutting the elastic member 33. When the elastic member 33 pushes the ejection member 32 to move, the ejection member 32 will not knock the ejection chamber 31 directly and avoid generating noise, potential damage caused by the impact between the ejection member 32 and the ejection chamber 31 could also be avoided, thus the safety and reliability of the ejection device 30 are improved.

Figure 17:
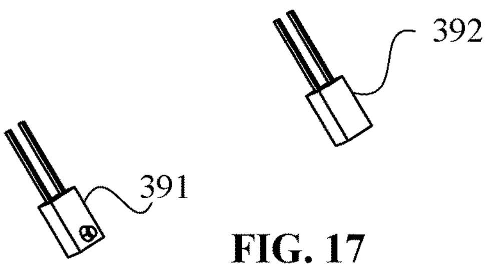
FIG. 17 is a schematic diagram of a signal transmitter and a signal receiver of an ejection device of an embodiment of the present application.

Referring to FIG. 2, FIG. 10, and FIG. 17 in combination, FIG. 17 is a schematic diagram of the signal transmitter and the signal receiver of the ejection device of the present application.

In one embodiment, the top of the ejection chamber 31 is provided with an inlet 311, the inlet 311 is connected to the storage device 20, and the food particles in the storage device 20 enter the ejection chamber 31 from the inlet 311.

Further, the ejection device 30 further comprises a signal transmitter 391 and a signal receiver 392, the signal transmitter 391 and the signal receiver 392 are provided on opposite sides of the ejection chamber 31 for detecting whether food particles fall into the ejection chamber 31 from the inlet 311. When food particles are detected by the signal transmitter 391 and the signal receiver 392, the first ejection drive member drives the ejection gear 34 rotates.

The signal transmitter 391 and signal receiver 392 can be infrared optocoupler, etc. When the signal receiver 392 does not receive the signal emitted by the signal transmitter 391, it is considered that the food particles fall into the ejection cavity 31 from the inlet 311, then feedback the corresponding information to the feeding equipment, the feeding equipment controls the ejection device 30 to eject the food particles.

Please refer to FIG. 1, FIG. 10 and FIG. 11 in conjunction. In one embodiment, the bottom of the ejection chamber 31 is provided with a first discharge port 381, the ejection device 30 also includes a food discharge member 383, the food discharge member 383 is provided with a food discharge channel inside, the food discharge member 383 is connected to the first discharge port 381, the food residue in the ejection chamber 31 is discharged from the first discharge port 381 through the food discharge channel.

Further, the housing assembly 10 is provided with a second discharge port 382 connected to the outside, and the food discharge member 383 is also connected to the second discharge port 382. Food residue discharged from the food discharge channel is discharged to the outside of the feeding equipment through the second discharge port 382 to avoid the food residue falling into the feeding equipment and polluting the inside of the feeding equipment, thus improve the safety and reliability of the feeding equipment. That is, the side of the ejection chamber 31 that cannot eject food particles is sealed so that food residues can be eliminated only through the first discharge port 381 to avoid food residues falling outside of the ejection device 30.

The feeding equipment further includes a collection tray 384, and the food discharge member 383 can also be connected to the collection tray 384, which is used to collect food scraps, and the collection tray 384 is removably provided in the housing assembly 10 to allow the user to remove the collection tray 384 to dispose the food scraps.

Further, the exterior of the ejection chamber 31 is provided with a fixed shaft 313, and the outer periphery of the fixed shaft 313 is provided with a cushion ring 314, and the fixed shaft 313 is fixed to the housing assembly 10 through the cushion ring 314 to enable the ejection chamber 31 to be stably set in the feeding equipment. The cushioning ring 314 can be a soft rubber ring, etc., to cushion the ejection force of the ejection device 30, so as to alleviate the vibration of the whole machine caused by the ejection of food particles.

For example, the ejection chamber 31 is provided with four fixed axes 313 on the outside to improve the stability of the ejection device 30. The specific number of fixed axes 313 can also be one, two, three or even more, without limitation here.

In the existing feeding equipment, the ejection device usually uses a cam to squeeze a pendulum, and then the pendulum drives a piston to squeeze a spring. After the cam and the pendulum are disengaged, the elastic return force of the spring pushes the piston to eject the food particles. Because the self-weight of the pendulum and the mechanism damping consume part of the elastic return force of the spring, the ejection force used to eject the food particles is reduced. Also, in this device, the compression distance of the spring is not adjustable, resulting in a non-adjustable thrust force that can be provided by the spring, and only a fixed ejection force can be used to eject the food particles. In other solutions, a motor is used to drive two identical cams to squeeze the piston backward in a linear motion, and after the cams and piston are disengaged, the piston ejects the food particles. In this scheme, the distance between the cams and the pistons is fixed, which also leads to a non-adjustable ejection force.

The ejection device of the present application can eject food particles by only pushing the ejection member through the elastic member, which reduces the influence caused by the self-weight of the ejection device during the ejection process and thus improves the ejection efficiency. Moreover, the ejection gear has at least two sets of engagement groups with different lengths along the circumference, which makes the ejection force of the ejection device variable.

Further, the current feeding equipment in the related technology has a problem that the ejection device is fixed and the ejection direction cannot be adjusted. To solve this problem, the present application describes a rotation device that drives the ejection device to rotate. The rotation device has a good stability.

Figure 18:
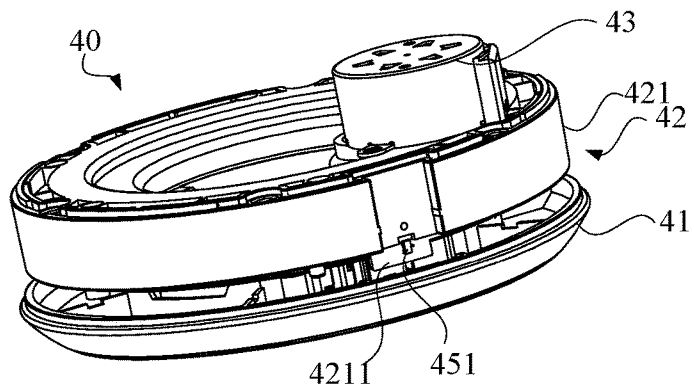
FIG. 18 is a schematic diagram of a rotation device of the present application.
Figure 19:
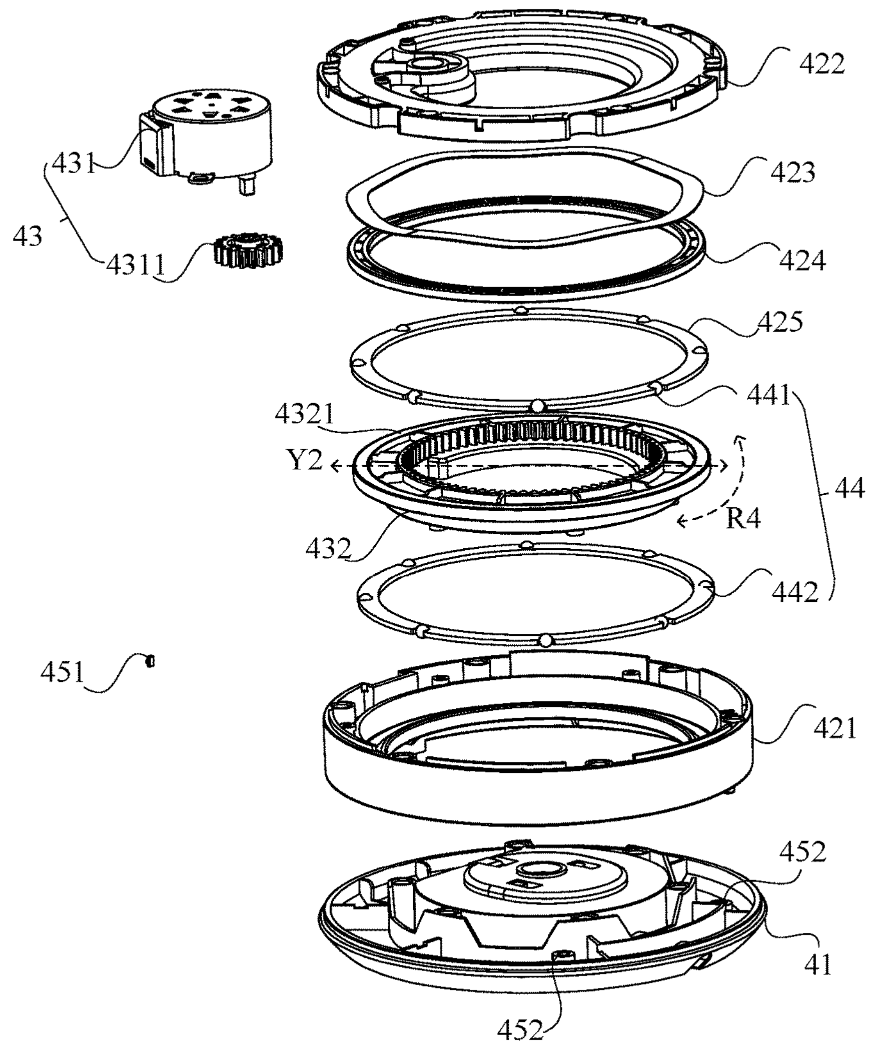
FIG. 19 is an exploded diagram of the rotation device shown in FIG. 18.

Referring to FIG. 18 and FIG. 19 in combination, FIG. 18 is a schematic diagram of a rotation device of the present application. FIG. 19 is an exploded diagram of the rotation device shown in FIG. 18.

In an embodiment, the feeding equipment of the present application is provided with a rotation device 40.

In one embodiment, the rotation drive assembly 43 includes a drive member 431 and a gear ring 4311 connected to the drive member 431. The gear ring 4311 is fixed to a base 41, and the drive member 431 is fixed to a bracket assembly 42. When the drive member 431 is operating, the bracket assembly 42 and the drive member 431 could be driven to rotate relative to the gear ring 4311 and the base 41, wherein the gear ring 4311 and the base 41 remain motionless. Or, the gear ring 4311 is fixed to the bracket assembly 42, the drive member 431 is fixed to the base 41, when the drive member 431 is operating, the gear ring 4311 and the base 41 could be driven to rotate relative to the bracket assembly 42 and the drive member 431, wherein the bracket assembly 42 and the drive member 431 remain motionless.

Further, the rolling structure includes a plurality of rolling members 44 spaced sequentially along a circumference R4 of a drive gear ring 432. The rolling members 44 are sandwiched between the drive gear ring 432 and the bracket assembly 42 to uniformly reduce the friction between the bracket assembly 42 and the drive gear ring 432 when they move relative to each other and improve the stability of the rotation device 40.

The following is an example of an embodiment in which the drive member 431 is fixed to the drive ring 432 and the drive ring 432 is fixed to the base 41.

The drive member 431 is positioned in the bracket assembly 42 and is connected to the drive ring 432. The drive ring 432 is laminated to the base 41 and is fixed to the base 41, so that the drive member 431 can drive the bracket assembly 42 to rotate relative to the drive ring 432. Moreover, a number of rolling members 44 are sandwiched between the drive gear ring 432 and the bracket assembly 42. The rolling members 44 are distributed sequentially at intervals along the circumference R4 of the drive gear ring 432, thereby the rotational friction between the bracket assembly 42 and the drive gear ring 432 can be reduced uniformly, and improving the stability of the rotation device 40. Furthermore, since the rolling member 44 reduces the rotational friction of the bracket assembly 42 as it rotates relative to the drive ring 432, it is able to increase the rotational speed of the rotation device 40 and reduce the heat generated by the friction, thereby extending the life of the rotation device 40.

As illustrated in FIG. 19, the drive gear ring 432 is a ring, the engagement teeth of the drive gear ring 432 are located in the inner side of the drive gear ring 432, such that the drive member 431 engages the engagement teeth located inside the drive gear ring 432 and can rotate relative to the drive gear ring 432 to drive the bracket assembly 42 to rotate relative to the drive gear ring 432. In other embodiments, the engagement teeth of the drive ring 432 may also be located in the outer side of the drive ring 432, i.e., the engagement teeth are oriented away from the center of the drive ring 432, without limitation herein.

In combination with the above embodiment, the feeding equipment includes the housing assembly 10, the storage device 20, and the ejection device 30, etc. (as shown in FIG. 1 and FIG. 2), and the above structure can be fixed to the bracket assembly 42 of the rotation device 40 to be able to drive a synchronous rotation of the housing assembly 10, the storage device 20, and the ejection device 30 when the bracket assembly 42 is rotated relative to the drive gear ring 432. Thereby the ejecting direction of food particles can be changed is a wide scale and the user's experience can be improved.

Please continue to refer FIG. 18 and FIG. 19. In one embodiment, the rolling members 44 are divided into at least a first rolling assembly 441 and a second rolling assembly 442, the first rolling assembly 441 and the second rolling assembly 442 each comprising a plurality of rolling members 44. The first rolling assembly 441 is located on the side of the drive gear ring 432 toward the base 41 and the second rolling assembly 442 is located on the side of the drive gear ring 432 away from the base 41 to reduce rotational friction between both sides of the drive gear 362 and the bracket assembly 42, so that the rotational friction between the two sides of the drive gear ring 432 can be balanced, and the stability of the rotation device 40 can be further improved.

The rolling members 44 of the first rolling assembly 441 and the rolling members 44 of the second rolling assembly 442 are each spaced sequentially along the circumference R4 of the drive gear ring 432, so that the rotational friction between the bracket assembly 42 and the drive gear ring 432 can be improved uniformly and the stability of the rotation device 40 can also be improved.

Further, the bracket assembly 42 includes a first bracket 421 and a second bracket 422 provided in a cascade, the first bracket 421 is connected to the second bracket 422, the driving gear ring 432 is sandwiched between the first bracket 421 and the second bracket 422. The first rolling assembly 441 is sandwiched between the driving gear ring 432 and the first bracket 421, and the second rolling assembly 442 is sandwiched between the driving gear ring 432 and the first rolling assembly 441. The first rolling assembly 441 improves the rotational friction between the first bracket 421 and the drive gear ring 432, and the second rolling assembly 442 improves the rotational friction between the second bracket 422 and the drive gear ring 432, such that the first and second brackets 421, 422 can rotate synchronously relative to the drive gear ring 432.

The rotation device 40 also includes a resilient washer 423, which is provided between the bracket assembly 42 and the rolling structure, thereby reducing a gap between the rolling structure and the drive ring 432.

The resilient washer 423 is provided between the first rolling assembly 441 and the first bracket 421 and/or between the second rolling assembly 442 and the second bracket 422, the resilient restoring force provided by the resilient washer 423 is used to press the rolling member 44 against the drive ring 432 to reduce the gap between the drive ring 432 and the rolling member 44 to avoid tilting or shaking of the rotation device 40, the stability and reliability of the rotation device 40 are thereby improved.

The resilient washer 423 is a wave washer. As illustrated in FIG. 19, the resilient washers 423 are complete rings, which in alternative embodiments may be a number of circular washers with a wave shape (not identified in the figures) and are not limited here.

The bracket assembly 42 further includes a third bracket 424 sandwiched between the resilient washer 423 and the rolling member 44 to further reduce the gap between the rolling member 44 and the rest of the structure. As shown in FIG. 19, for example, the third bracket 424 is provided on the side of the drive ring 432 toward the second bracket 422. Since the elastic washer 423 is clamped between the second bracket 422 and the third bracket 424, the elastic washer 423 can make the third bracket 424 have a tendency to move toward the rolling member 44 to reduce the gap between the third bracket 424 and the rolling member 44 and the gap between the rolling member 44 and the drive gear ring 432 to further improve the stability of the rotation device 40.

The third bracket 424 may also be provided on the side of the drive ring 432 facing the base 41 or one third bracket 424 on each side of the drive ring 432, without limitation herein.

Figure 20:
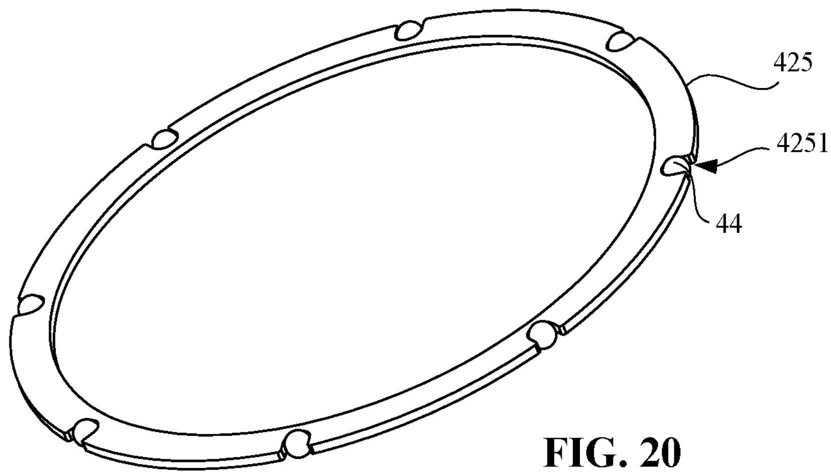
FIG. 20 is a schematic diagram of a rolling member and a cage of an embodiment of the present application.

Referring to FIG. 19 and FIG. 20 in combination, FIG. 20 is a schematic diagram of an embodiment of a rolling member and a cage of the present application.

In one embodiment, the bracket assembly 42 further includes a cage 425 provided with a cage slot 4251. The cage slot 4251 runs through the cage 425 along the relative direction of the drive gear ring 432 and the base 41, and the rolling members 44 are embedded in the cage slot 4251 for limiting the relative position of the rolling members 44 on the radial Y2 of the drive gear ring 432 to prevent the relative position of the rolling members 44 from changing during the rotation of the bracket assembly 42.

Further, cages 425 are provided between the drive gear ring 432 and the first bracket 421 and between the drive gear ring 432 and the second bracket 422, respectively. The rolling member 44 of the first rolling assembly 441 and the rolling member 44 of the second rolling assembly 442 are embedded in the cage slot 4251 of the corresponding cage 425, the rolling member 44 of the first rolling assembly 441 is clamped between the drive gear ring 432 and the first bracket 421, and the rolling member 44 of the second rolling assembly 442 is clamped between the drive gear ring 432 and the second bracket 422, so that the rolling members 44 on both sides of the drive gear ring 432 can roll synchronously to avoid the rolling members 44 from detaching from the rotation device 40, thus improving the reliability of the rotation device 40. Optionally, the first rolling assembly 441 has the same number of rolling members 44 as the second rolling assembly 442.

As illustrated in FIG. 20, eight rolling members 44 are embedded in the cage 425, and the eight rolling members 44 are evenly distributed. Of course, in alternative embodiments, the number of rolling members 44 embedded in the cage 425 is not limited to eight.

Figure 21:
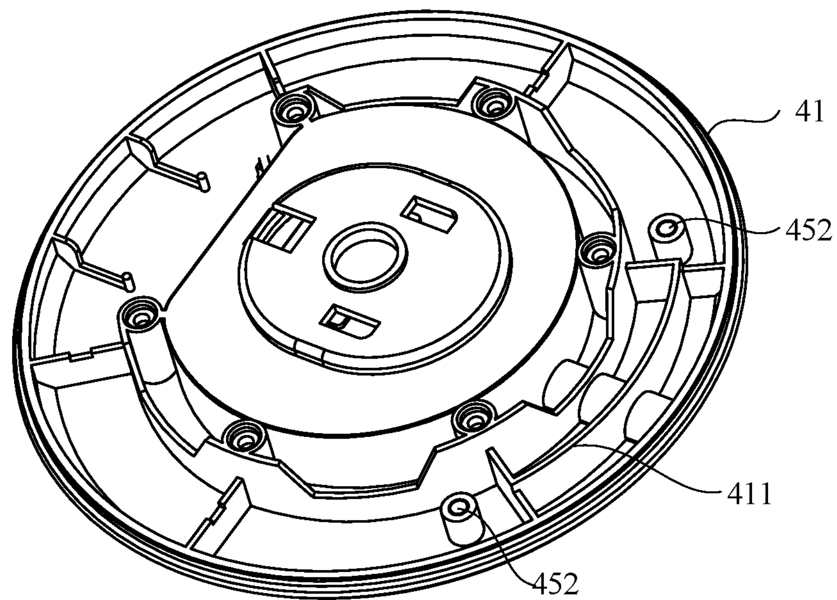
FIG. 21 is a schematic diagram of a base and a second sensing element of an embodiment of the present application

Referring to FIG. 18, FIG. 19, and FIG. 21 in combination, FIG. 21 is a schematic diagram of the base and the second sensing element of an embodiment of the present application.

In one embodiment, the first bracket 421 is provided with a first sensing element 451, the base 41 is provided with a second sensing element 452 located in a rotation path of the first sensing element 451. The first sensing element 451 is able to move with the relative rotation between the bracket assembly 42 and the drive gear ring 432 to oppose the second sensing element 452 in order to limit the rotation range of the bracket assembly 42 relative to the drive ring 432.

For example, as illustrated in FIG. 18 and FIG. 21, when the first bracket 421 is rotated until the first sensing element 451 is opposite the second sensing element 452, corresponding information is fed back to the feeding equipment to control the drive member 431 to reverse the rotation to drive the bracket assembly 42 to rotate in the opposite direction. When the first sensing element 451 is again opposite the second sensing element 452, the drive member 431 is reversed to drive the bracket assembly 42 to rotate in the opposite direction, and the cycle is repeated to limit the rotation range of the rotation device 40.

Further, the first bracket 421 is provided with a baffle 4211 extending toward the base 41, the base 41 is provided with a limit 411 located in a rotational path of the baffle 4211. The baffle 4211 is capable of moving with the rotation of the bracket assembly 42 to abut the limit 411. The bracket assembly 42 can continue to rotate in the current direction of rotation when the stop 4211 is not abutting the limit portion 411. When the baffle 4211 abuts the limit portion 411, the bracket assembly 42 changes rotating direction to limit the relative rotation between the bracket assembly 42 and the drive gear ring 432.

In combination with the first sensing element 451 and the second sensing element 452 described above, when the baffle 4211 of the first bracket 421 abuts the limiting portion 411, the first sensing element 451 is opposed to the second sensing element 452 to limit further relative rotation between the bracket assembly 42 and the drive gear ring 432.

For example, the first sensing element 451 and the second sensing element 452 can be Hall magnetic sensor and magnet, respectively, the Hall magnetic sensor rotates with the first bracket 421, and when the Hall magnetic sensor is opposite to the magnet, the corresponding signal can be fed back to the feeding equipment. It can also be a magnet set in the first bracket 421, Hall magnetic sensor set in the base 41, which can also achieve the above function.

The base 41 may be provided with an infrared optocoupler, etc., to feed a corresponding signal to the feeding equipment when the baffle of the first holder 421 passes the infrared optocoupler, without limitation here.

Please continue to refer to FIG. 19. In one embodiment, the circumference of the drive gear ring 432 is provided with a rolling groove 4321 extending along the circumference R4 of the drive gear ring 432, and the rolling structure is embedded in the rolling groove 4321, thereby avoiding the rolling structure from falling off, and thus contributing to the safety as well as reliability of the rotation device 40.

Specifically, the rolling member 44 is embedded in the rolling groove 4321, and the rolling member 44 can roll along the rolling groove 4321 with the relative rotation between the bracket assembly 42 and the driving gear ring 432, thus limiting the rolling path of the rolling member 44 and avoiding the safety hazard of the rolling member 44 falling off, which in turn is conducive to improving the safety and reliability of the rotation device 40.

Some rotation devices in the related technology usually adopt the plastic axis hole structure, thus the rotation device can only drive the ejection device to rotate 180 degrees. Because of the poor tolerance of plastic material, it is easy to generate loose or tight problems. When the plastic axis hole assembly is tight, the friction between the plastic axis hole and the other structures of the rotation device is huge, resulting in a sharp increase in the rotation torque. When the plastic axis hole assembly is loose, there is a gap between the structures of the rotation device, resulting in the rotation device is very easy to shake. The high speed of the rotation device will generate a lot heat, but the plastic material has no high temperature resistance and wear resistance and will damage the rotation device when the plastic axis hole assembly is loose. Other rotation devices employ a groove ball bearing as a support. The single groove ball bearing will generate gaps in the radial and axial direction, resulting in easy skewed and shaking when rotation. If a double row rolling bearing is used as a support, the volume of the rotation device will be increased significantly.

However, the rotation device described in the above embodiment can reduce the rotational friction between the bracket assembly and the driving gear ring by the rolling member, and the elastic washer can reduce the gap between the structures of the rotation device and increase the compression force between the constituent structures. The rotation radius of the rotation device is large and limitless (e.g., 360 degrees), which can increase the rigidity and stability of the rotation device. The rotation device is configured to rotate in the range of 0 degree to 360 degree. At the same time, the rotation device described in the above embodiment has a simple structure and a small size which are conducive to reducing the volume of the rotation device.

Please continue to refer to FIG. 1 and FIG. 2 in conjunction. In an embodiment, the feeding equipment also includes a camera device 50, the camera device 50 can automatically capture the current position of the pet to drive the feeding equipment to rotate, thereby change the ejection direction of the ejection device 30. Monitoring function can also be achieved by the camera device 50 to increase the functionality and fun of the feeding equipment.

Further, the feeding equipment further includes a power cord 60 connected to an external power source to supply power to the feeding equipment from the external power source to maintain the functions of the feeding equipment such as feeding, ejecting food particles, and rotation.

The storage chamber in the storage device is capable of storing food particles, and the food particles are pushed towards the first elastic wheel and the second elastic wheel by the mixing wheel, so that the food particles are driven by the first elastic wheel and the second elastic wheel to pass between them and fall into the ejection device through the discharge side, thus ejecting the food particles to the outside by the ejection device. Since the ejection gear has at least two engagement groups with different lengths around the circumference of the ejection gear, and with the moving member can make the ejection member have different ejection force to change the ejection distance of food particles. The feeding equipment also has a rotation device. The storage device and the ejection device are provided in the bracket assembly so that when the bracket assembly rotates relative to the driving gear ring, the storage device and the ejection device can rotate synchronously to change the ejection direction of the food particles, which is reasonably designed to improve the user's experience.

In addition, in this application, unless otherwise expressly specified and limited, the terms "connected", "connected", "laminated", etc. are to be understood in a broad sense, e.g., they can be fixed connections. For example, it can be a fixed connection, a removable connection, or an integrated connection; it can be a direct connection or an indirect connection through an intermediate medium; it can be a connection within two components or an interaction between two components. To a person of ordinary skill in the art, the specific meaning of the above terms in this application can be understood on a case-by-case basis.

Finally, it should be noted that the above embodiments are used only to illustrate the technical solutions of the present application, not to limit them; although the present application is described in detail with reference to the foregoing embodiments, it should be understood by those of ordinary skill in the art that it is still possible to modify the technical solutions recorded in the foregoing embodiments, or to replace some or all of the technical features thereof; and these modifications or replacements, do not make the essence of the corresponding technical solutions out of the scope of the technical solutions of the present application; and do not make the essence of the corresponding technical solutions out of the scope of the technical solutions of the embodiments of the present application.

What is claimed is:

1. An apparatus comprising:

a base;

an ejection device configured to eject, via a food outlet on the apparatus, one or more of a plurality of food items; and a rotation device operably mounted to the ejection device, wherein the rotation device is configured to rotate the ejection device relative the base to cause a change to a direction of ejection of the one or more of the plurality of food items relative to the base, wherein:

the rotation device comprises a motor, a ring, and a ring gear, the motor is connected to the ring gear, the ring gear is connected to a bracket assembly, the rotation of the bracket assembly causes the rotation of the ejection device, the ring is connected between the ring gear and the bracket assembly, the ring comprises a plurality of slots, and each of the slots is embedded with a rolling member.

2. The apparatus of claim 1, further comprising:

a storage compartment configured to store the plurality of food items for feeding one or more pets.

3. The apparatus of claim 2, wherein the rotation of the rotation device causes rotation of the storage compartment.

4. The apparatus of claim 2, wherein:

the storage compartment comprises two rotatable wheels, and rotation of the two rotatable wheels causes the one or more of the plurality of food items to move to a storage compartment outlet.

5. The apparatus of claim 4, wherein at least one of the two rotatable wheels is an elastic wheel and comprises one or more hollow portions.

6. The apparatus of claim 5, wherein movement of the one or more of the plurality of food items causes at least one of the one or more hollow portions to deform.

7. The apparatus of claim 4, wherein at least one of the two rotatable wheels is a rigid wheel.

8. The apparatus of claim 4, wherein:

the storage compartment comprises a mixing device, and the mixing device is configured to advance the one or more of the plurality of food items to the two rotatable wheels.

9. The apparatus of claim 8, wherein:

the two rotatable wheels are spaced to form a channel, and the channel is located between the mixing device and the storage compartment outlet.

10. The apparatus of claim 2, wherein the storage compartment comprises a mixing device configured to mix the plurality of the food items.

11. The apparatus of claim 1, wherein the rotation of the rotation device does not cause rotation of the base.

12. The apparatus of claim 1, wherein the rotation device is configured to rotate 360 degree.

13. The apparatus of claim 1, wherein the rotation device comprises one or more washers.

14. The apparatus of claim 1, further comprising:

a housing that houses the ejection device; and a camera attached to the housing.

15. The apparatus of claim 1, wherein:

the ejection device comprises an ejection member, a spring, and an ejection gear, movement of the ejection member causes the ejection device to engage with a first part of a plurality of parts of the ejection gear, and the spring and the engagement with the first part of the plurality of parts of the ejection gear cause the ejection of the one or more of the plurality of food items at a first length.

16. The apparatus of claim 15, wherein:

movement of the ejection member causes the ejection member to engage with a second part of the plurality of parts of the ejection gear, and the engagement with the second part of the plurality of parts of the ejection gear causes ejection of another one or more of the plurality of food items at a second length, the second length being different from the first length.

17. An apparatus comprising:

a first body portion and a second body portion, the first and second body portions being rotatably coupled to each other;

a food outlet located in the second body portion;

an ejection device mounted with the second body portion, the ejection device being configured to eject, via the food outlet, one or more food items from the apparatus; and a rotation device configured to move the first body portion and the second body portion relative to each other and thereby changing a direction of ejection of the one or more of the food items relative to the first body portion, wherein:

the rotation device comprises a motor, a ring, and a ring gear, the motor is connected to the ring gear, the ring gear is connected to a bracket assembly, the rotation of the bracket assembly causes the rotation of the ejection device, the ring is connected between the ring gear and the bracket assembly, the ring comprises a plurality of slots, and each of the slots is embedded with a rolling member.

18. The apparatus of claim 17, further comprising:

a camera attached to the second body portion.

19. The apparatus of claim 17, wherein the rotation device is configured to rotate 360 degree.

* * * * *